United States Patent
Yamori

(10) Patent No.: US 10,893,290 B2
(45) Date of Patent: Jan. 12, 2021

(54) APPARATUS FOR MOVING IMAGE CODING, APPARATUS FOR MOVING IMAGE DECODING, AND NON-TRANSITORY COMPUTER-READABLE STORAGE MEDIUM

(71) Applicant: FUJITSU LIMITED, Kanagawa (JP)

(72) Inventor: Akihiro Yamori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 15/825,277

(22) Filed: Nov. 29, 2017

(65) Prior Publication Data
US 2018/0184112 A1      Jun. 28, 2018

(30) Foreign Application Priority Data

Dec. 27, 2016   (JP) ................................ 2016-253533

(51) Int. Cl.
*H04N 19/513*      (2014.01)
*H04N 19/573*      (2014.01)
(Continued)

(52) U.S. Cl.
CPC ........... *H04N 19/521* (2014.11); *H04N 19/52* (2014.11); *H04N 19/527* (2014.11);
(Continued)

(58) Field of Classification Search
CPC .... H04N 19/521; H04N 19/527; H04N 19/52; H04N 19/573; H04N 19/597; H04N 19/91; G06T 2207/20021
See application file for complete search history.

(56) References Cited

U.S. PATENT DOCUMENTS

| 7,570,309 B2* | 8/2009 | Zhou ...................... H04N 5/145 348/607 |
| 8,164,641 B2* | 4/2012 | Kawakatsu ........... G06T 3/4038 348/218.1 |

(Continued)

FOREIGN PATENT DOCUMENTS

| JP | 3-275049 A | 10/1996 |
| JP | 2002-112274 A | 4/2002 |

(Continued)

OTHER PUBLICATIONS

"Entaniya Fisheye support blog" [online], [retrieved on Nov. 16, 2016], the Internet <URL: https://www.entapano.com/blog/360-degree-panoramic-video-camera/>, with English translation.

(Continued)

*Primary Examiner* — Xuemei G Chen
(74) *Attorney, Agent, or Firm* — Fujitsu Patent Center

(57) ABSTRACT

An apparatus for moving image coding includes: a memory configured to store a reference panoramic image used for coding a coding-target panoramic image obtained by extending a panoramic image included in panoramic video photographed by an imaging device; and a processor coupled to the memory and configured to execute a decision process that includes deciding a vector that represents an amount of shift of the coding-target panoramic image relative to the reference panoramic image, execute a correction process that includes generating a corrected coding-target panoramic image by correcting a position of each of a plurality of coding-target regions in the coding-target panoramic image in accordance with the vector that represents the amount of shift, and execute a coding process that includes coding an image of each of the plurality of coding-target regions in the corrected coding-target panoramic image by using the reference panoramic image.

9 Claims, 23 Drawing Sheets

(51) Int. Cl.
*H04N 19/52* (2014.01)
*H04N 19/527* (2014.01)
*H04N 19/91* (2014.01)
*H04N 19/597* (2014.01)

(52) U.S. Cl.
CPC .. *H04N 19/573* (2014.11); *G06T 2207/20021* (2013.01); *H04N 19/597* (2014.11); *H04N 19/91* (2014.11)

(56) References Cited

U.S. PATENT DOCUMENTS

| | | | | |
|---|---|---|---|---|
| 8,908,055 | B2* | 12/2014 | Furumura | G06T 3/4038 348/218.1 |
| 10,291,910 | B2* | 5/2019 | Adsumilli | H04N 19/124 |
| 2006/0034529 | A1 | 2/2006 | Park et al. | |
| 2006/0034530 | A1* | 2/2006 | Park | G06T 9/004 382/236 |
| 2006/0215930 | A1* | 9/2006 | Terui | G06T 3/4038 382/284 |
| 2010/0231731 | A1* | 9/2010 | Motomura | H04N 5/23248 348/208.4 |
| 2012/0189167 | A1* | 7/2012 | Kurata | H04N 5/145 382/107 |
| 2013/0148860 | A1* | 6/2013 | Musatenko | G06K 9/00228 382/107 |
| 2013/0243092 | A1* | 9/2013 | Sugio | H04N 19/105 375/240.16 |
| 2015/0189182 | A1* | 7/2015 | Ho | H04N 5/23267 348/208.6 |
| 2015/0271356 | A1* | 9/2015 | Terada | H04N 19/50 348/231.99 |
| 2016/0350893 | A1* | 12/2016 | Fletcher | G06T 3/0081 |
| 2017/0085917 | A1* | 3/2017 | Hannuksela | H04N 19/597 |
| 2017/0118475 | A1* | 4/2017 | Chang | H04N 19/56 |
| 2017/0163994 | A1* | 6/2017 | Sanchez De La Fuente | H04N 21/4312 |
| 2017/0214937 | A1* | 7/2017 | Lin | H04N 19/56 |
| 2017/0230668 | A1* | 8/2017 | Lin | H04N 19/563 |
| 2019/0082184 | A1* | 3/2019 | Hannuksela | H04N 13/161 |
| 2019/0222862 | A1* | 7/2019 | Shin | H04N 19/563 |

FOREIGN PATENT DOCUMENTS

| | | |
|---|---|---|
| JP | 2008-510359 | 4/2008 |
| JP | 2010-109917 | 5/2010 |
| JP | 2013-218432 | 10/2013 |

OTHER PUBLICATIONS

"Theta" [online], [retrieved on Nov. 16, 2016], the Internet <URL: https://theta360.com/ja/about/theta/>, with English translation.

"Professional Plug&Play 360° Video Camera" [online], [retrieved on Nov. 16, 2016], the Internet <URL: http://www.sphericam.com/sphericam2/>.

Japanese Office Action dated Aug. 18, 2020 for corresponding Japanese Patent Application No. 2016-253533, with English Translation, 13 pages.

* cited by examiner

APPARATUS FOR MOVING IMAGE CODING, APPARATUS FOR MOVING IMAGE DECODING, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-253533, filed on 27 Dec. 2016, the entire contents of which are incorporated herein by reference.

FIELD

The embodiment discussed herein is related to an apparatus for moving image coding, an apparatus for moving image decoding, and a non-transitory computer-readable storage medium.

BACKGROUND

In moving image coding, an image of a rectangular region is divided into blocks and motion compensation and frequency transform are carried out in units of block in many cases. As a representative moving image coding system, the International Organization for Standardization/the International Electrotechnical Commission (ISO/IEC) 23008-2 High Efficiency Video Coding (HEVC) is cited.

In recent years, function enhancement of cameras that photograph video has been advanced and a tendency toward transition from photographing of rectangular regions to wider-angle panoramic photographing has been seen. Furthermore, photographing of all-around panoramic video by use of a fisheye lens and photographing of 360° panoramic video by use of plural cameras are also becoming possible (for example, refer to "Entaniya Fisheye support blog," [online], [retrieved on 16 Nov. 2016], the Internet <URL: https://www.entapano.com/blog/360-degree-panoramic-video-camera/> (hereinafter, Non-patent Document 1), "THETA," [online], [retrieved on 16 Nov. 2016], the Internet <URL: https://theta360.com/ja/about/theta/> (hereinafter, Non-patent Document 2), and "Professional Plug&Play 360° Video Camera," [online], [retrieved on 16 Nov. 2016], the Internet <URL: http://www.sphericam.com/sphericam2/> (hereinafter, Non-patent Document 3)).

There is also a motion estimation method of panoramic video including 360° omnidirectional video information (for example, refer to Japanese National Publication of International Patent Application No. 2008-510359 (hereinafter, Patent Document 1)). There are also a method in which a motion vector search area is decided by using a global vector between images and a method in which a panoramic image is divided to generate a panoramic image with which it is easy to monitor a moving object (for example, refer to Japanese Laid-open Patent Publication No. 2010-109917 (hereinafter, Patent Document 2) and Japanese Laid-open Patent Publication No. 2013-218432 (hereinafter, Patent Document 3)).

SUMMARY

According to an aspect of the embodiment, an apparatus for moving image coding includes: a memory configured to store a reference panoramic image used for coding a coding-target panoramic image obtained by extending a panoramic image included in panoramic video photographed by an imaging device; and a processor coupled to the memory and configured to execute a decision process that includes deciding a vector that represents an amount of shift of the coding-target panoramic image relative to the reference panoramic image, execute a correction process that includes generating a corrected coding-target panoramic image by correcting a position of each of a plurality of coding-target regions in the coding-target panoramic image in accordance with the vector that represents the amount of shift, and execute a coding process that includes coding an image of each of the plurality of coding-target regions in the corrected coding-target panoramic image by using the reference panoramic image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In related arts, in the case of coding panoramic video with large motion, many motion vectors are generated and the coding efficiency (compression ratio) decreases in some cases.

In one aspect, the embodiment discussed herein aims at improving the coding efficiency of panoramic video.

The embodiment will be described in detail below with reference to the drawings.

In the case of coding a panoramic image of each clock time included in panoramic video, because the photographed panoramic image is in a distorted state, the coding efficiency decreases if the photographed panoramic image is directly coded. Therefore, it is effective to correct the distortion of the panoramic image and extend the panoramic image into a rectangular panoramic image and thereafter divide the extended panoramic image into given regions as units of coding and carry out coding in units of given region.

The rectangular panoramic image at each clock time is often referred to as a frame or picture and the given region as the unit of coding is often referred to as a block.

If the reference position when a rectangular panoramic image is divided into blocks is a position fixed relative to the photographed panoramic image, video in which all blocks move in a certain direction between frames is often generated due to panning, positional deviation, or movement of a camera. If such a panoramic image is coded while the reference position is fixed, unnecessarily many motion vectors are generated and the coding efficiency decreases.

In the motion estimation method of Patent Document 1, the highness of the correlativity of panoramic video including 360° omnidirectional video information is utilized. For example, pixels at a screen left boundary part are read as pixels in a region on the further right side of the screen right boundary. Furthermore, pixels at a screen right boundary part are read as pixels in a region on the further left side of the screen left boundary. This may improve the image quality of the right boundary part and the left boundary part of the screen.

This motion estimation method is based on the premise that the position of the camera is fixed and does not greatly move regarding photographed omnidirectional panoramic video. For example, the target of this motion estimation method is panoramic video obtained by looking around the surroundings by 360° with a given point being the center.

However, in recent years, handy-type or vehicle-mounted-type all-around cameras like cameras represented in Non-patent Document 1 to Non-patent Document 3 have come to be used.

Figure 1:
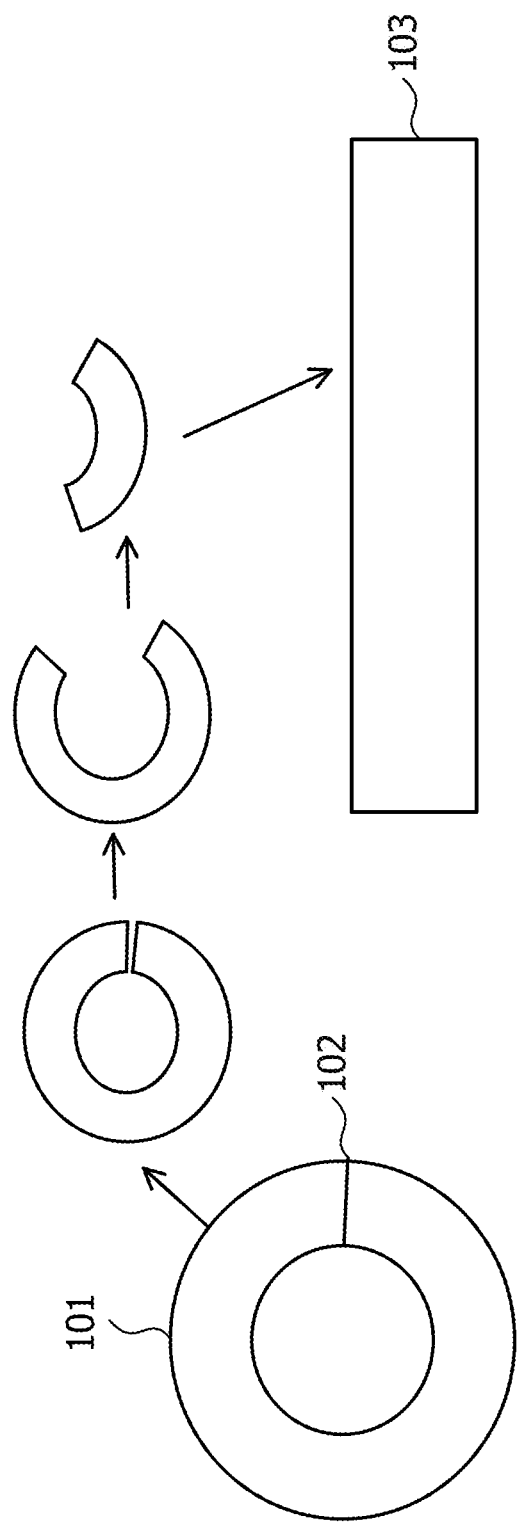
FIG. 1 is a diagram illustrating a first extended panoramic image.

FIG. 1 illustrates an example of a first extended panoramic image generated by extending a panoramic image photographed by the camera of Non-patent Document 1. This camera may photograph a circular panoramic image 101 by using a single convex lens (fisheye lens).

For example, if the panoramic image 101 is photographed with the convex lens oriented straight upward outdoors, the sky appears at the central part of the panoramic image 101 and thus an extended panoramic image 103 may be generated by using the region excluding the central part. In this case, the extended panoramic image 103 is generated by cutting the panoramic image 101 at a boundary line 102 and converting the panoramic image 101 into a rectangular shape.

Figure 2:
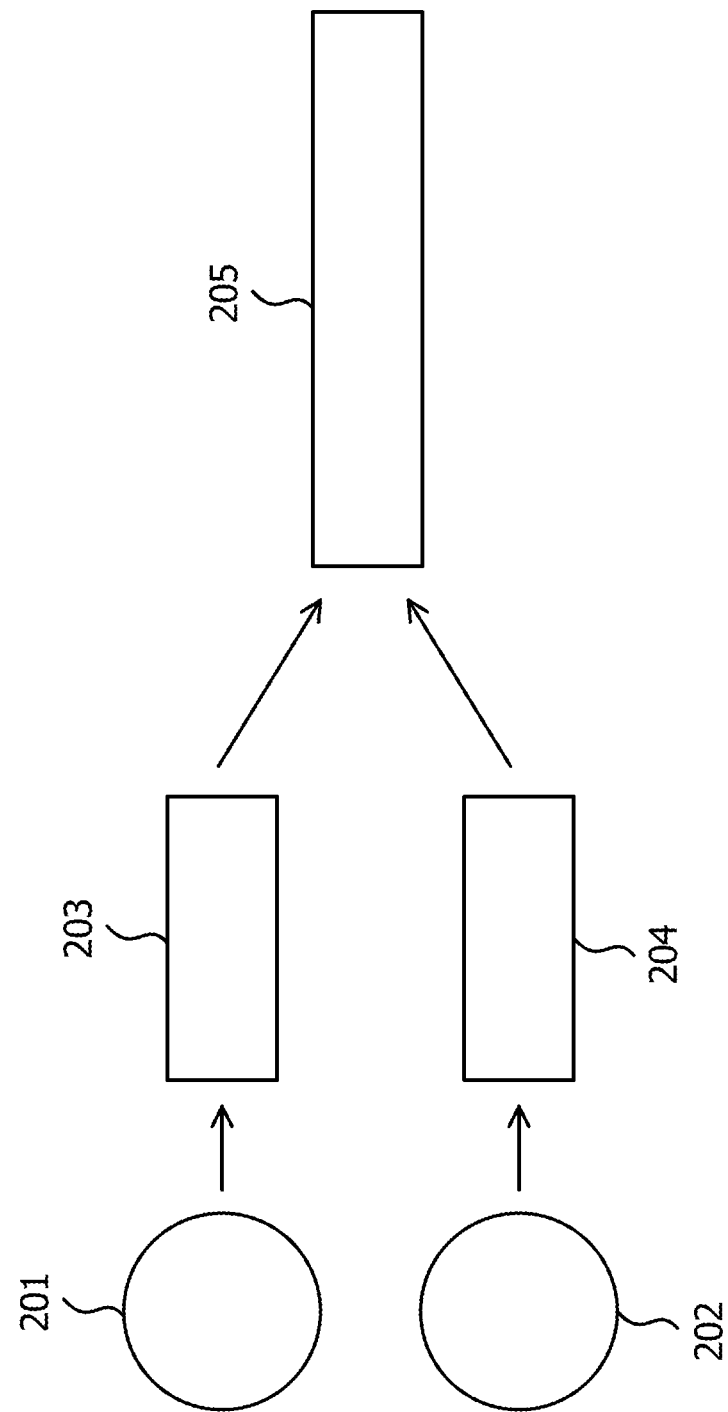
FIG. 2 is a diagram illustrating a second extended panoramic image.

FIG. 2 illustrates an example of a second extended panoramic image generated by extending a panoramic image photographed by the 360° camera of Non-patent Document 2. This 360° camera may photograph a panoramic image 201 and a panoramic image 202 having a circular shape by using two cameras disposed in a back-to-back manner.

For example, if a user who rides a vehicle carries out photographing while orienting one camera toward the front side in the traveling direction, a scene on the front side appears in the panoramic image 201 and a scene on the rear side appears in the panoramic image 202. In this case, an extended panoramic image 203 of the front side and an extended panoramic image 204 of the rear side are generated by converting each of the panoramic image 201 and the panoramic image 202 into a rectangular shape. Moreover, it is also possible to generate an all-around panoramic image 205 by joining the extended panoramic image 203 and the extended panoramic image 204.

Figure 3:
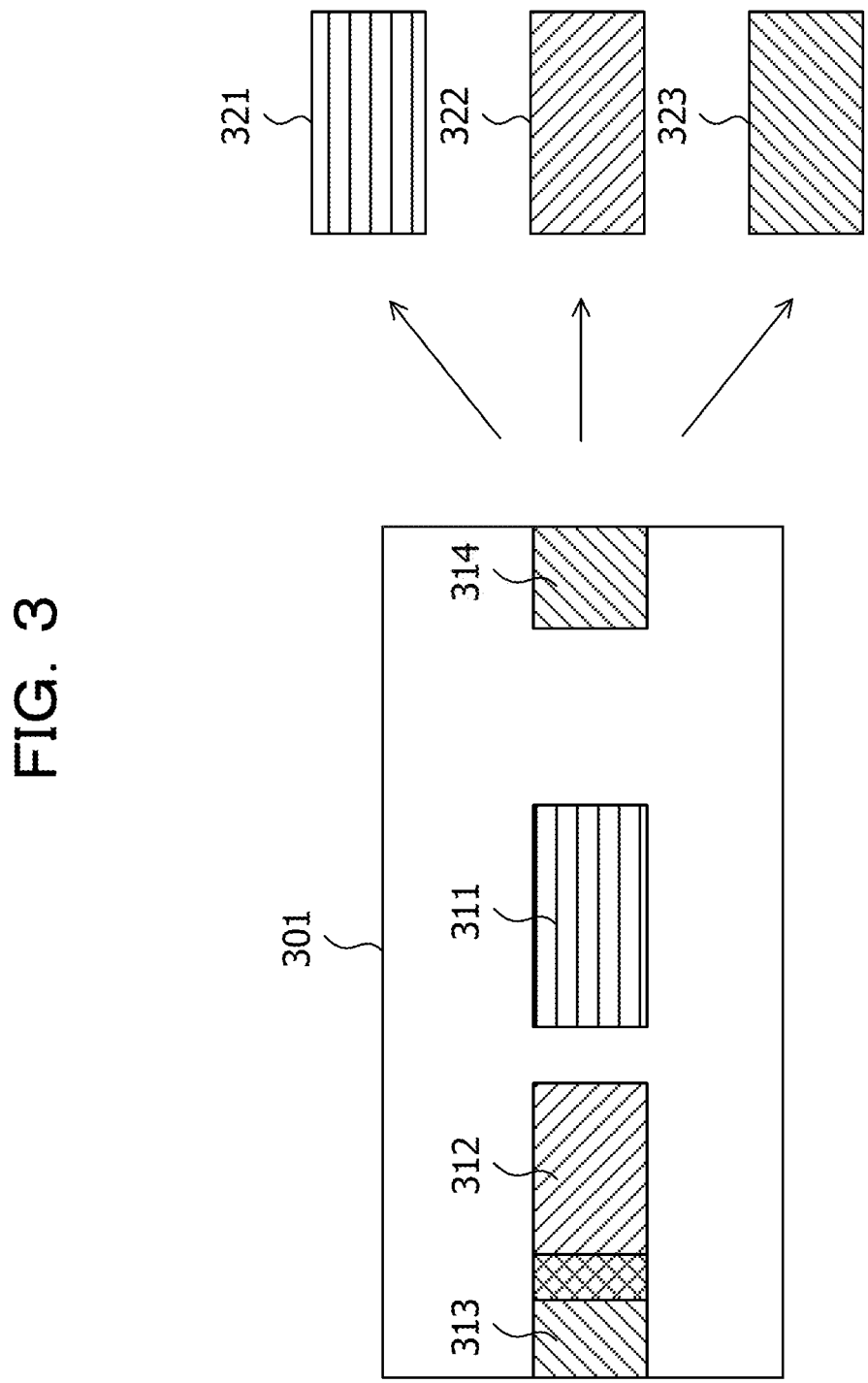
FIG. 3 is a diagram illustrating a third extended panoramic image.

FIG. 3 illustrates an example of a third extended panoramic image generated by extending a panoramic image photographed by the 360° camera of Non-patent Document 3. This 360° camera may photograph a panoramic image 301 of the whole space including not only the horizontal whole circumference but also the upper side and the lower side by using six cameras disposed in a spherical manner.

For example, if this 360° camera is mounted on the roof of a vehicle and photographing is carried out, a scene on the front side in the traveling direction appears in a region 311 in the panoramic image 301. Furthermore, a scene on the left rear side appears in a region 312 and a scene on the right rear side appears in a region 313 and a region 314. In this case, an extended panoramic image 321 of the front side and an extended panoramic image 322 of the left rear side are generated by converting each of the images of the region 311 and the region 312 into a rectangular shape. In addition, an extended panoramic image 323 of the right rear side is generated by converting the images of the region 313 and the region 314 into a rectangular shape.

Moreover, it is also possible to generate an all-around panoramic image by joining plural extended panoramic images including the extended panoramic image 321 to the extended panoramic image 323.

The panoramic image 101 in FIG. 1, the panoramic image 201 and the panoramic image 202 in FIG. 2, and the panoramic image 301 in FIG. 3 are distorted in many cases because being images obtained by photographing of a wide field of view. On the other hand, the extended panoramic image 103, the extended panoramic image 203, the extended panoramic image 204, the all-around panoramic image 205, and the extended panoramic image 321 to the extended panoramic image 323 have been converted to rectangular shapes and are images without distortion.

In moving image coding, the efficiency of ME (Motion Estimation) and so forth becomes better when panoramic video without distortion is coded than when panoramic video involving distortion is coded. Therefore, it is expected that opportunities of using an extended panoramic image increase in coding of panoramic video.

The ME efficiency is represented by the absolute value of the difference between an image of each block in a coding-target panoramic image and an image of a prediction block decided based on a motion vector, for example. In this case, the ME efficiency becomes better when the absolute value of the difference is smaller.

The moving image coding includes motion compensation and frequency transform in units of block and therefore generated information is mainly motion vector information and difference information subjected to the frequency transform. For this reason, if the ME efficiency is almost equivalent, the information amount of the motion vector information greatly affects the coding efficiency. Furthermore, in a panoramic image hardly involving motion and a panoramic image involving large motion, a larger amount of motion vector information is generated with the latter. For example, with a panoramic image involving larger motion, the amount of generated codes becomes larger and the coding efficiency becomes lower.

It is also possible to set the quantization scale larger in order to suppress the amount of generated codes and keep the coding efficiency at a certain level. However, in this case, the image quality of the panoramic image restored from the coded panoramic image deteriorates.

As described above, if video in which all blocks move in a certain direction between frames is generated due to panning, positional deviation, or movement of a camera, with the motion estimation method of Patent Document 1, many motion vectors are generated and the coding efficiency decreases.

Figure 4:
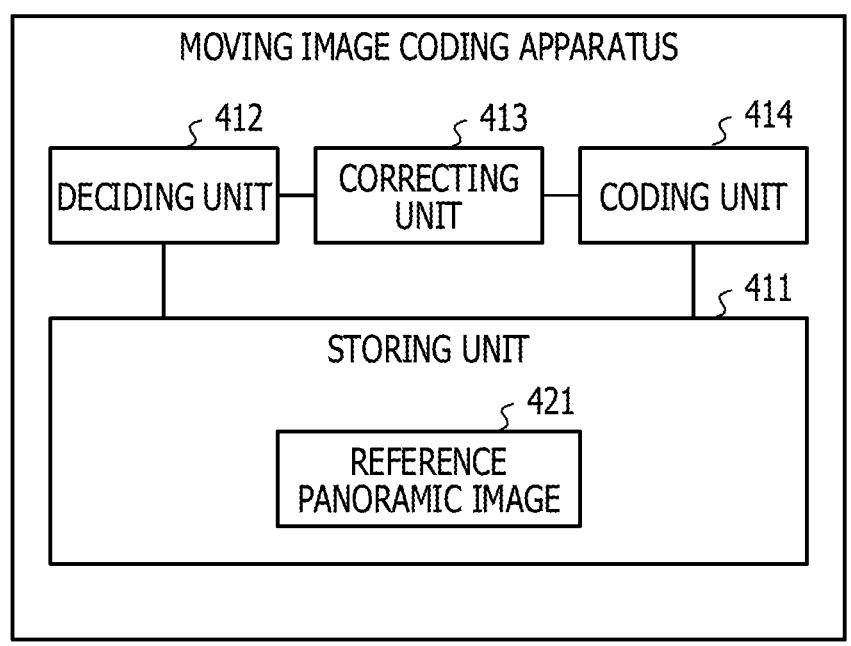
FIG. 4 is a functional configuration diagram of a first moving image coding apparatus.

FIG. 4 illustrates a functional configuration example of a first moving image coding apparatus of the embodiment. A moving image coding apparatus 401 of FIG. 4 includes a storing unit 411, a deciding unit 412, a correcting unit 413, and a coding unit 414. The storing unit 411 stores a reference panoramic image 421 used for coding a coding-target panoramic image. The coding-target panoramic image is a panoramic image obtained by extending a panoramic image included in panoramic video photographed by an imaging device. The deciding unit 412, the correcting unit 413, and the coding unit 414 execute moving image coding processing by using the reference panoramic image 421.

Figure 5:
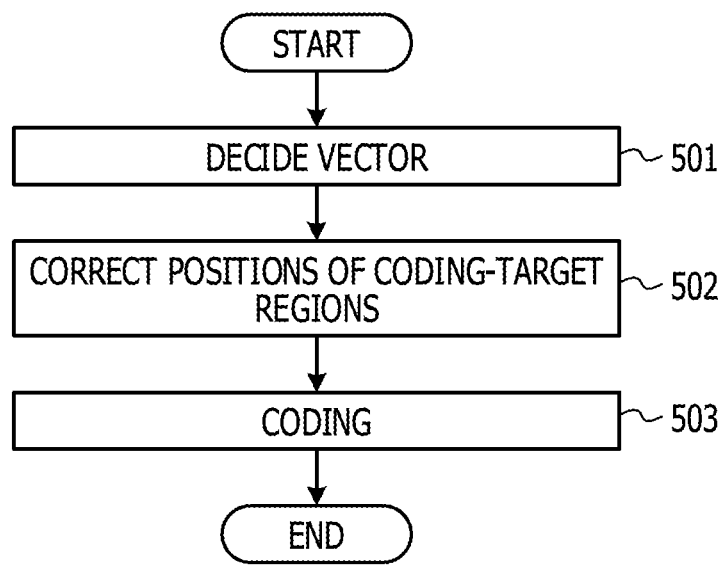
FIG. 5 is a flowchart of first moving image coding processing.

FIG. 5 is a flowchart illustrating an example of first moving image coding processing executed by the moving image coding apparatus 401 of FIG. 4. First, the deciding unit 412 decides a vector that represents the amount of shift of a coding-target panoramic image relative to the reference panoramic image 421 (step 501).

Next, the correcting unit 413 corrects the position of each of plural coding-target regions in the coding-target panoramic image based on the vector that represents the amount of shift and thereby generates the corrected coding-target panoramic image (step 502). Then, the coding unit 414 codes an image of each of the plural coding-target regions in the corrected coding-target panoramic image by using the reference panoramic image 421 (step 503).

According to such a moving image coding apparatus 401, the coding efficiency of panoramic video may be improved.

Figure 6:
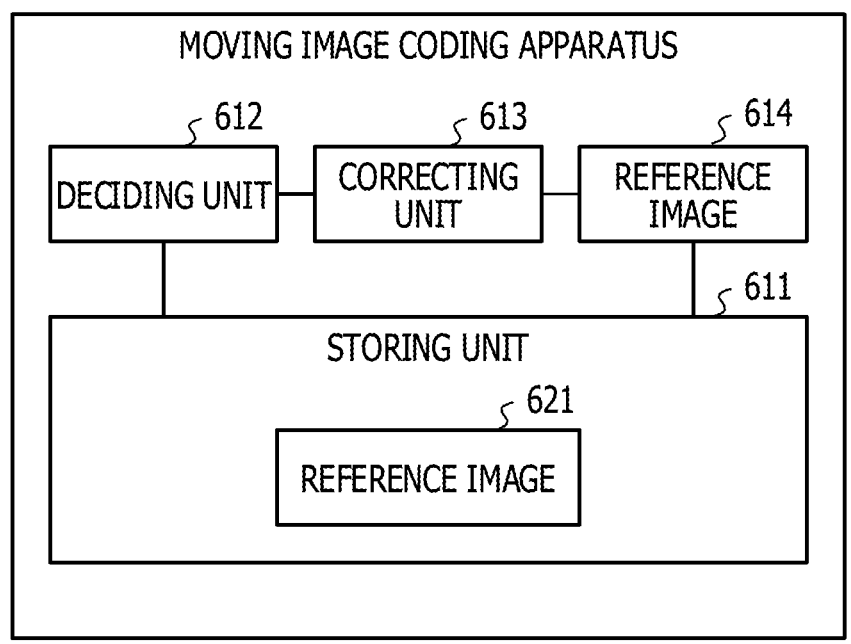
FIG. 6 is a functional configuration diagram of a second moving image coding apparatus.

FIG. 6 illustrates a functional configuration example of a second moving image coding apparatus of the embodiment. A moving image coding apparatus 601 of FIG. 6 includes a storing unit 611, a deciding unit 612, a correcting unit 613, and a coding unit 614. The storing unit 611 stores a reference image 621 used for coding a coding-target panoramic image. The coding-target panoramic image is a panoramic image included in panoramic video obtained by combining plural pieces of video photographed by plural imaging devices. The deciding unit 612, the correcting unit 613, and the coding unit 614 execute moving image coding processing by using the reference image 621.

Figure 7:
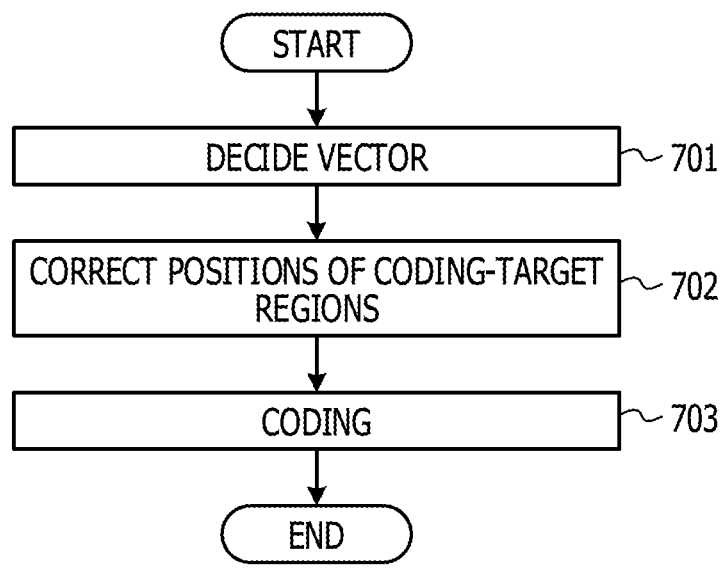
FIG. 7 is a flowchart of second moving image coding processing.

FIG. 7 is a flowchart illustrating an example of second moving image coding processing executed by the moving image coding apparatus 601 of FIG. 6. First, if a coding-target region in a coding-target panoramic image is shifted relative to the reference image 621 due to the movement of the photographic range of each of plural pieces of video, the deciding unit 612 decides a vector that represents the amount of shift of the coding-target region relative to the reference image 621 (step 701).

Next, the correcting unit 613 corrects the position of the coding-target region in the coding-target panoramic image based on the vector that represents the amount of shift and thereby generates the corrected coding-target region (step 702). Then, the coding unit 614 codes an image of the corrected coding-target region by using the reference image 621 (step 703).

According to such a moving image coding apparatus 601, the coding efficiency of panoramic video may be improved.

Figure 8:
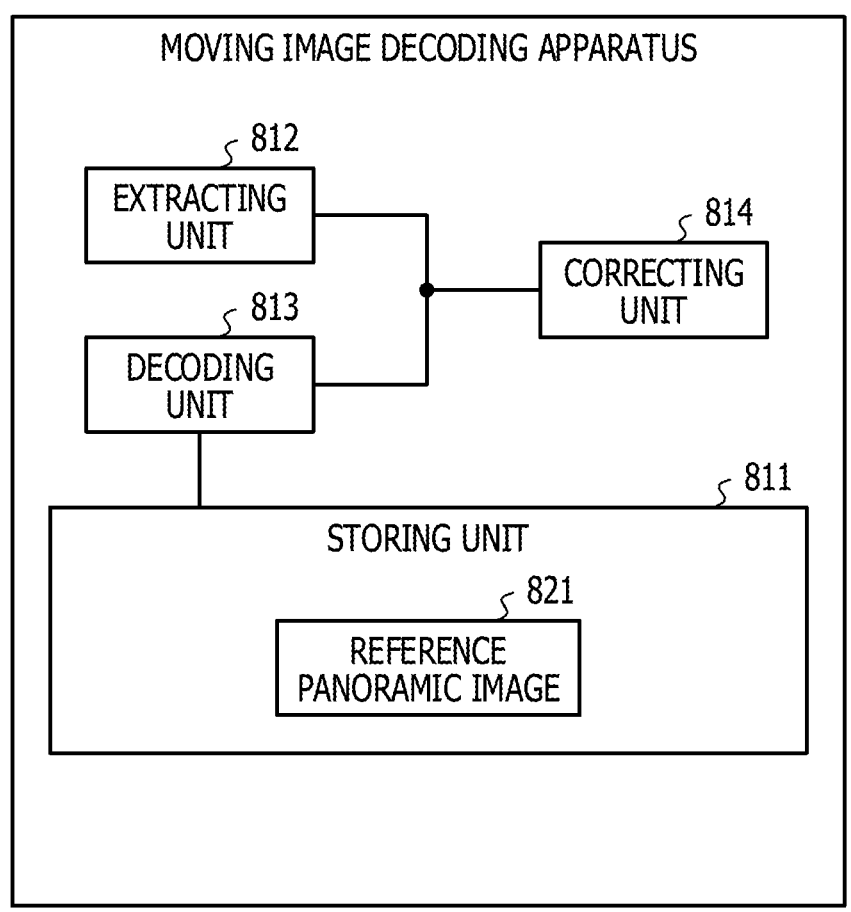
FIG. 8 is a functional configuration diagram of a moving image decoding apparatus.

FIG. 8 illustrates a functional configuration example of a moving image decoding apparatus of the embodiment. A moving image decoding apparatus 801 of FIG. 8 includes a storing unit 811, an extracting unit 812, a decoding unit 813, and a correcting unit 814. The moving image coding apparatus 401 of FIG. 4 generates a coded panoramic image by coding a coding-target panoramic image. The moving image decoding apparatus 801 decodes coded panoramic video including the coded panoramic image generated by the moving image coding apparatus 401.

The storing unit 811 stores a reference panoramic image 821 used for decoding the coded panoramic image. The extracting unit 812, the decoding unit 813, and the correcting unit 814 execute moving image decoding processing by using the reference panoramic image 821.

Figure 9:
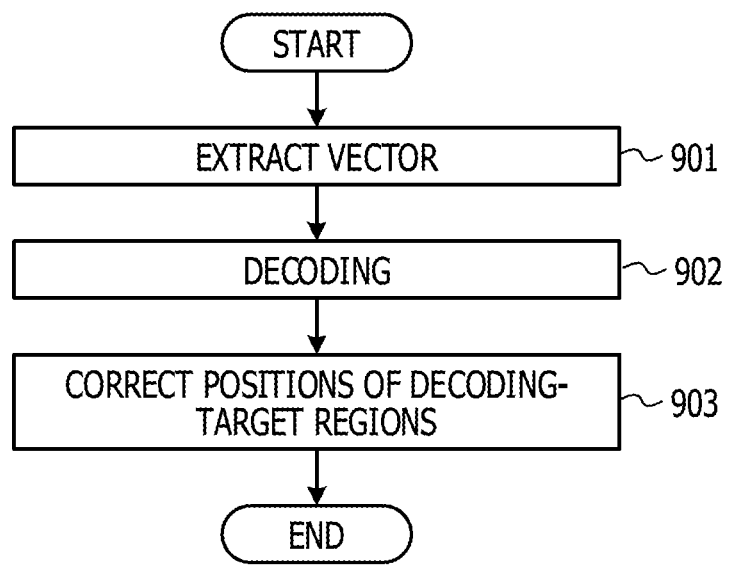
FIG. 9 is a flowchart of moving image decoding processing.

FIG. 9 is a flowchart illustrating an example of moving image decoding processing executed by the moving image decoding apparatus 801 of FIG. 8. First, the extracting unit 812 extracts a vector that represents the amount of shift of a coding-target panoramic image relative to the reference panoramic image 821 from coded panoramic video (step 901).

Next, the decoding unit 813 decodes each of plural decoding-target regions in the coded panoramic image by using the reference panoramic image 821 to generate a decoded panoramic image (step 902). Then, the correcting unit 814 corrects the position of each of plural decoding-target regions in the decoded panoramic image based on the vector that represents the amount of shift and thereby restores the coding-target panoramic image (step 903).

According to such a moving image decoding apparatus 801, the coding efficiency of panoramic video may be improved.

Figure 10:
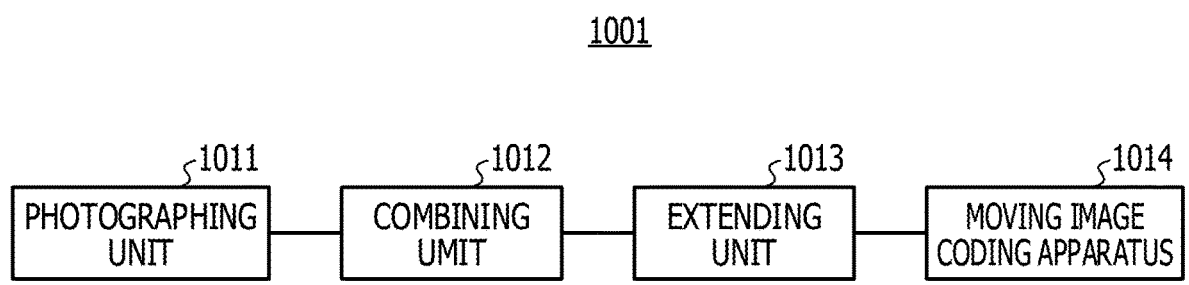
FIG. 10 is a configuration diagram of a panoramic video coding system.

FIG. 10 illustrates a configuration example of a panoramic video coding system. A panoramic video coding system 1001 of FIG. 10 includes a photographing unit 1011, a combining unit 1012, an extending unit 1013, and a moving image coding apparatus 1014.

The photographing unit 1011 includes one or plural imaging devices. As the photographing unit 1011 including one imaging device, the camera of Non-patent Document 1 may be used, for example. Furthermore, as the photographing unit 1011 including plural imaging devices, the 360° camera of Non-patent Document 2 or the 360° camera of Non-patent Document 3 may be used, for example.

If the photographing unit 1011 includes one imaging device, the combining unit 1012 outputs an all-around panoramic image of each clock time included in panoramic video photographed by the imaging device. The extending unit 1013 generates an extended panoramic image by dividing the all-around panoramic image into plural regions and repeating a planar homography in units of region. In this case, the moving image coding apparatus 1014 corresponds to the moving image coding apparatus 401 of FIG. 4 and codes the extended panoramic image of each clock time to generate a bit stream of coded panoramic video.

On the other hand, if the photographing unit 1011 includes plural imaging devices, the combining unit 1012 combines images included in pieces of video photographed by the respective imaging devices and generates an all-around panoramic image, and the extending unit 1013 converts the all-around panoramic image to generate an extended panoramic image. In this case, the moving image coding apparatus 1014 corresponds to the moving image coding apparatus 601 of FIG. 6 and codes the extended panoramic image of each clock time to generate a bit stream of coded panoramic video.

When the photographing unit 1011 is still, typically the same photographic range obtained by looking around the surroundings by 360° with the photographing unit 1011 being the center is photographed as the whole of the all-around panoramic image. However, there is a possibility that the point of origin of the all-around panoramic image at each clock time is shifted due to panning or the like of the photographing unit 1011 and thus the position of the subject that appears in the image is shifted. On the other hand, when the photographing unit 1011 is moving, it is envisaged that the photographic range changes over time and the subject that appears in the image also changes.

Figure 11:
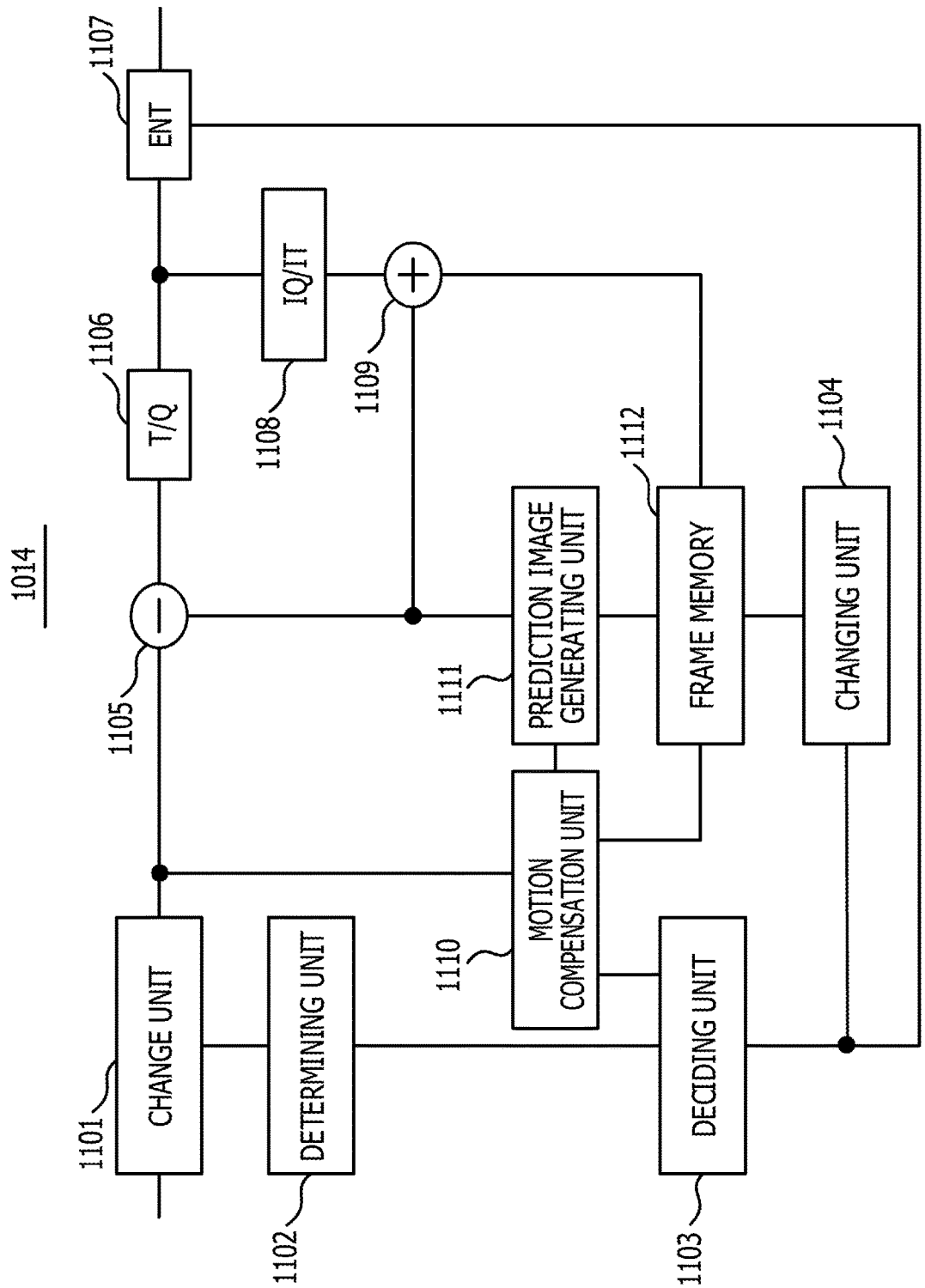
FIG. 11 is a functional configuration diagram illustrating a concrete example of a moving image coding apparatus.

FIG. 11 illustrates a concrete example of the moving image coding apparatus 1014 in FIG. 10. The moving image coding apparatus 1014 of FIG. 11 includes a change unit 1101, a determining unit 1102, a deciding unit 1103, a change unit 1104, a subtracting unit 1105, a transform-and-quantization unit (T/Q) 1106, and an entropy coding unit (ENT) 1107. Moreover, the moving image coding apparatus 1014 includes an inverse quantization-and-inverse transform unit (IQ/IT) 1108, an adding unit 1109, a motion compensation unit 1110, and a prediction image generating unit 1111, and a frame memory 1112.

First, description will be made about operation in the case in which the moving image coding apparatus 1014 corresponds to the moving image coding apparatus 401 of FIG. 4. In this case, the change unit 1101 and the determining unit 1102 correspond to the correcting unit 413 and the deciding unit 1103 corresponds to the deciding unit 412. The subtracting unit 1105, the T/Q 1106, the ENT 1107, the IQ/IT 1108, the adding unit 1109, the motion compensation unit 1110, and the prediction image generating unit 1111 correspond to the coding unit 414 and the frame memory 1112 corresponds to the storing unit 411.

An extended panoramic image generated by the extending unit 1013 is input to the moving image coding apparatus 1014 as a coding-target panoramic image. The moving image coding apparatus 1014 codes the coding-target panoramic image and outputs the coded panoramic image as a bit stream. The coding-target panoramic image is divided into plural blocks and each block is input to the subtracting unit 1105 and the motion compensation unit 1110 as a coding-target block. The coding-target block corresponds to the coding-target region.

The deciding unit 1103 decides a global vector that represents the amount of shift of the coding-target panoramic image relative to a reference panoramic image stored by the frame memory 1112 by using motion vectors output from the motion compensation unit 1110. Then, the deciding unit 1103 outputs the decided global vector to the determining unit 1102, the change unit 1104, and the ENT 1107.

The deciding unit 1103 may use the global vector of a panoramic image that has been already coded as the global vector of the coding-target panoramic image or decide the global vector based on the result of motion estimation with use of a reduced panoramic image with which the amount of processing is small.

The determining unit 1102 determines whether or not to change the position of each coding-target block in the coding-target panoramic image based on the global vector and outputs the global vector and the determination result to the change unit 1101.

If the determination result indicates that the position of each coding-target block is to be changed, the change unit 1101 changes the position of each coding-target block based on the global vector and outputs the changed coding-target blocks to the subtracting unit 1105 and the motion compensation unit 1110. On the other hand, if the determination result indicates that the position of each coding-target block is not to be changed, the change unit 1101 outputs each coding-target block to the subtracting unit 1105 and the motion compensation unit 1110 as it is.

The subtracting unit 1105 outputs, to the T/Q 1106, a prediction error signal that represents the difference between the coding-target block and a prediction block image output from the prediction image generating unit 1111. The T/Q 1106 transforms the prediction error signal to a frequency signal by an orthogonal transform and quantizes the frequency signal to generate coefficient information. As the orthogonal transform, a discrete cosine transform, a discrete wavelet transform, or the like is used. Then, the T/Q 1106 outputs the generated coefficient information to the ENT 1107 and the IQ/IT 1108.

The IQ/IT 1108 inversely quantizes the coefficient information output from the T/Q 1106 to generate a frequency signal, and transforms the frequency signal to a reconstructed prediction error signal by an inverse orthogonal transform. Then, the IQ/IT 1108 outputs the reconstructed prediction error signal to the adding unit 1109.

The adding unit 1109 generates a decoded block image by adding the prediction block image output from the prediction image generating unit 1111 and the reconstructed prediction error signal, and outputs the generated decoded block to the frame memory 1112. If the position of the coding-target block has been changed, the change unit 1104 returns the position of the decoded block image to the position of the coding-target block before the change based on the global vector.

The frame memory 1112 accumulates the decoded block image and outputs the accumulated decoded block image to the motion compensation unit 1110 and the prediction image generating unit 1111 as a reference image. Plural decoded block images generated from a respective one of plural coding-target blocks in the coding-target panoramic image correspond to a reference panoramic image.

The motion compensation unit 1110 generates a motion vector by carrying out motion estimation for the coding-target block by using the reference image, and outputs the generated motion vector to the deciding unit 1103. In the motion estimation, for example, unidirectional prediction with use of one reference panoramic image or bidirectional prediction with use of two or more reference panoramic images is carried out. Then, the motion compensation unit 1110 acquires the reference image indicated by the motion vector from the reference panoramic image and outputs the reference image to the prediction image generating unit 1111.

The prediction image generating unit 1111 generates an intra-prediction block image of the coding-target block from the pixel value of peripheral pixels that have been already coded in the coding-target panoramic image by using the reference image. Furthermore, the prediction image generating unit 1111 uses the reference image output from the motion compensation unit 1110 as an inter-prediction block image. Then, the prediction image generating unit 1111 selects either the intra-prediction block image or the inter-prediction block image and outputs the selected prediction block image to the subtracting unit 1105 and the adding unit 1109.

The ENT 1107 carries out entropy coding of the coefficient information output from the T/Q 1106, information on the prediction mode of intra-prediction or inter-prediction, and information on the global vector output from the deciding unit 1103. In the entropy coding, a variable-length code is assigned according to the appearance frequency of each symbol in the signal. Then, the ENT 1107 outputs a bit stream including the variable-length codes.

Figure 12:
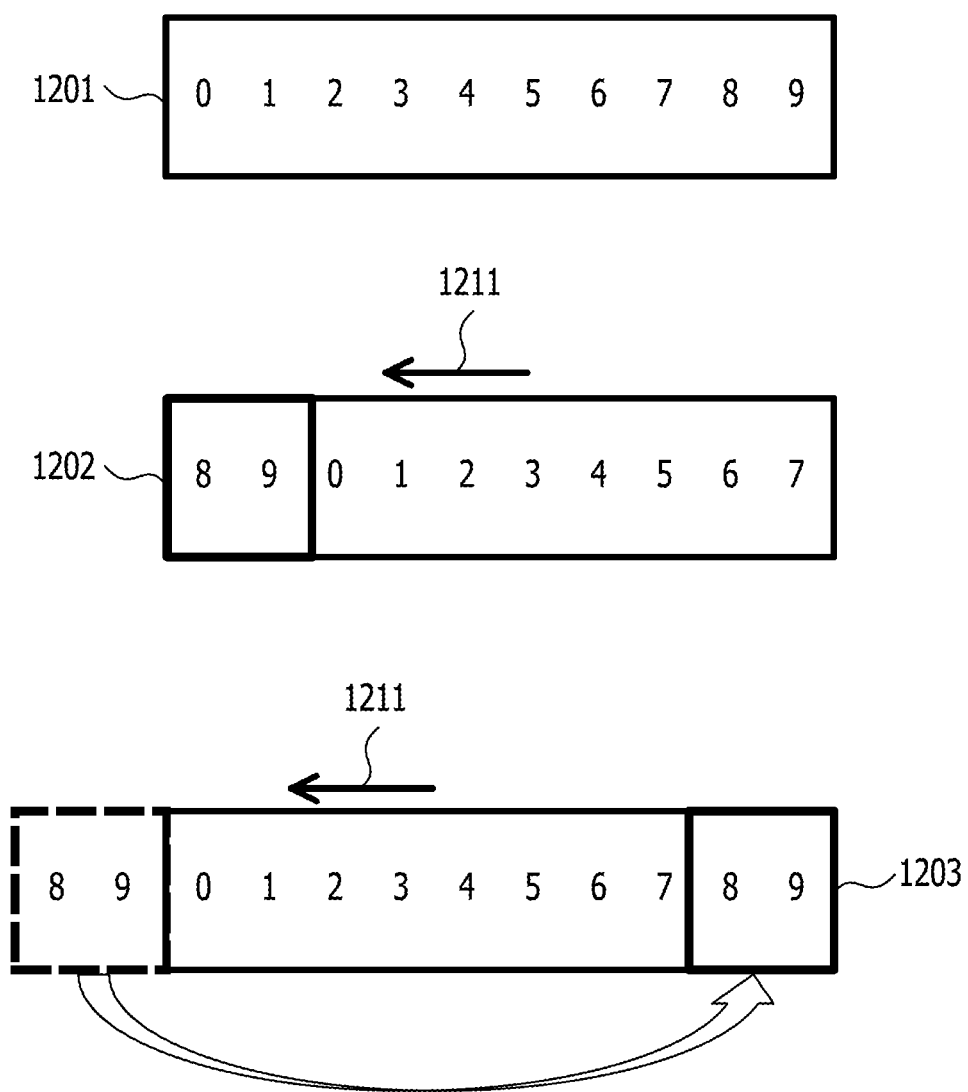
FIG. 12 is a diagram illustrating correction processing.

FIG. 12 illustrates an example of correction processing executed by the change unit 1101. In this example, numbers 0 to 9 are used in order to discriminate plural positions in an all-around panoramic image. In the case of the all-around panoramic image, the image at position 0 at the left end and the image at position 9 at the right end are continuous as illustrated in FIG. 1 and thus the correction processing may be executed by utilizing this continuousness.

If the positions of the respective subjects in a coding-target panoramic image 1202 are collectively shifted rightward relative to the positions of the respective subjects in a reference panoramic image 1201, the same motion vector 1211 is generated regarding the blocks at position 0 to position 7. However, if this state is accepted as it is, a motion vector completely different from the motion vector 1211 is generated regarding the blocks at position 8 and position 9.

Therefore, the deciding unit 1103 decides the motion vector 1211 as a global vector and the change unit 1101 shifts the position of each block in the coding-target panoramic image 1202 leftward in accordance with the motion vector 1211. Then, the change unit 1101 adds the image of the blocks at position 8 and position 9 that run over from the coding-target panoramic image 1202 to the right end of the coding-target panoramic image 1202 and thereby generates a coding-target panoramic image 1203. In this case, the point of origin of the coding-target panoramic image 1203 is changed from position 8 to position 0 and corresponds with the point of origin of the reference panoramic image 1201.

Due to this, the motion of the respective subjects in the coding-target panoramic image 1203 relative to the respective subjects in the reference panoramic image 1201 becomes almost 0 and thus it becomes possible to suppress the generated motion vectors to the minimum.

Figure 13:
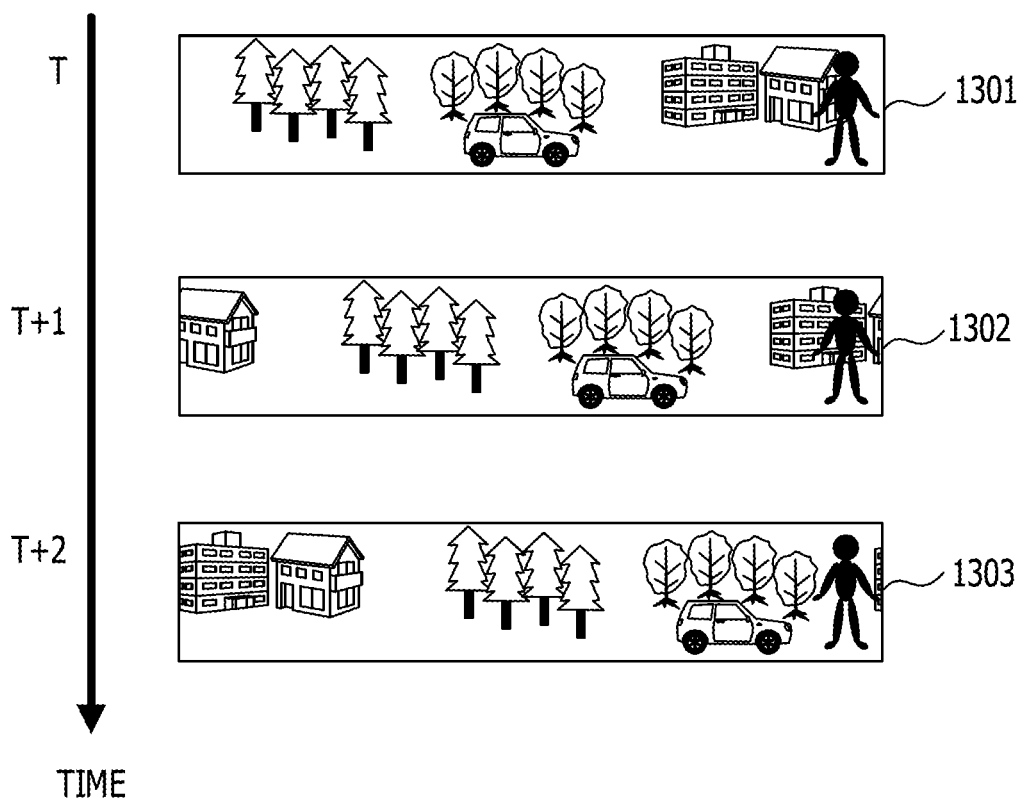
FIG. 13 is a diagram illustrating all-around panoramic video.

FIG. 13 illustrates an example of all-around panoramic video including a person. A panoramic image 1301, a panoramic image 1302, and a panoramic image 1303 represent coding-target panoramic images at a clock time T, a clock time T+1, and a clock time T+2, respectively. The position of the person that appears in these three panoramic images does not change. Instead, the positions of subjects on the background are shifted rightward over time. In this case, because the area of the background with the motion is larger than the area of the still person, it is preferable to shift the point of origin of each panoramic image leftward so that the background may be still.

Figure 14:
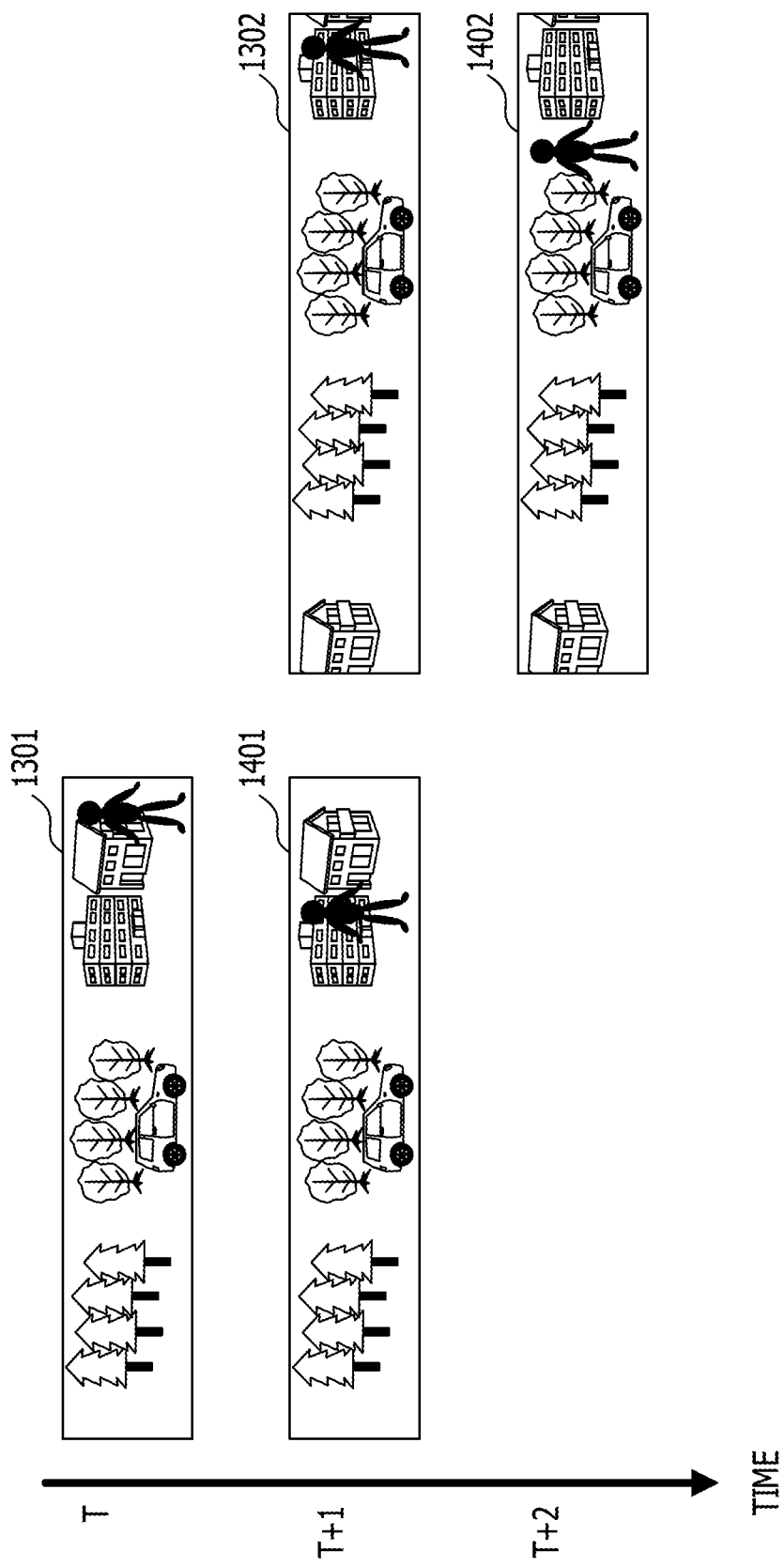
FIG. 14 is a diagram illustrating correction processing for all-around panoramic video.

FIG. 14 illustrates an example of correction processing for the all-around panoramic video of FIG. 13. If the panoramic image 1301 is used as the reference panoramic image in motion estimation of the panoramic image 1302, the deciding unit 1103 decides a motion vector that represents the motion of the background of the panoramic image 1302 relative to the background of the panoramic image 1301 as a global vector.

Then, the change unit 1101 generates a panoramic image 1401 by shifting the position of each block in the panoramic image 1302 leftward in accordance with the global vector and adding the image of blocks that run over from the panoramic image 1302 to the right end. If the panoramic image 1401 is coded instead of the panoramic image 1302, motion vectors regarding the background having the large area are hardly generated and motion vectors are generated with focus on the person having the small area. Therefore, generated motion vector information may be suppressed and the coding efficiency is improved.

Similar correction processing is executed also when the panoramic image 1302 is used as the reference panoramic image in motion estimation of the panoramic image 1303. In this case, the deciding unit 1103 decides a motion vector that represents the motion of the background of the panoramic image 1303 relative to the background of the panoramic image 1302 as a global vector.

Then, the change unit 1101 generates a panoramic image 1402 by shifting the position of each block in the panoramic image 1303 leftward in accordance with the global vector and adding the image of blocks that run over from the panoramic image 1303 to the right end. By coding the panoramic image 1402 instead of the panoramic image 1303, the coding efficiency is improved.

In decoding of the coded panoramic image generated by the moving image coding apparatus 1014, based on the global vector, the position of each block in the coded panoramic image is shifted in the opposite direction. This may restore the panoramic image 1302 and the panoramic image 1303.

As above, by changing the point of origin of the coding-target panoramic image based on the global vector, it becomes possible to adaptively change the position of the boundary line that cuts the all-around panoramic image according to the motion of the image. It is preferable to carry out the change in the point of origin according to the motion of forward prediction. For example, the point of origin may be changed in such a manner that only forward-predictive pictures (P-pictures) are deemed as the target.

The ENT 1107 may insert information on the global vector in a bit stream as header information. In this case, a moving image decoding apparatus that has received the bit stream may acquire the global vector by referring to the header information and return the position of each block in the coded panoramic image to the original position.

Figure 15:
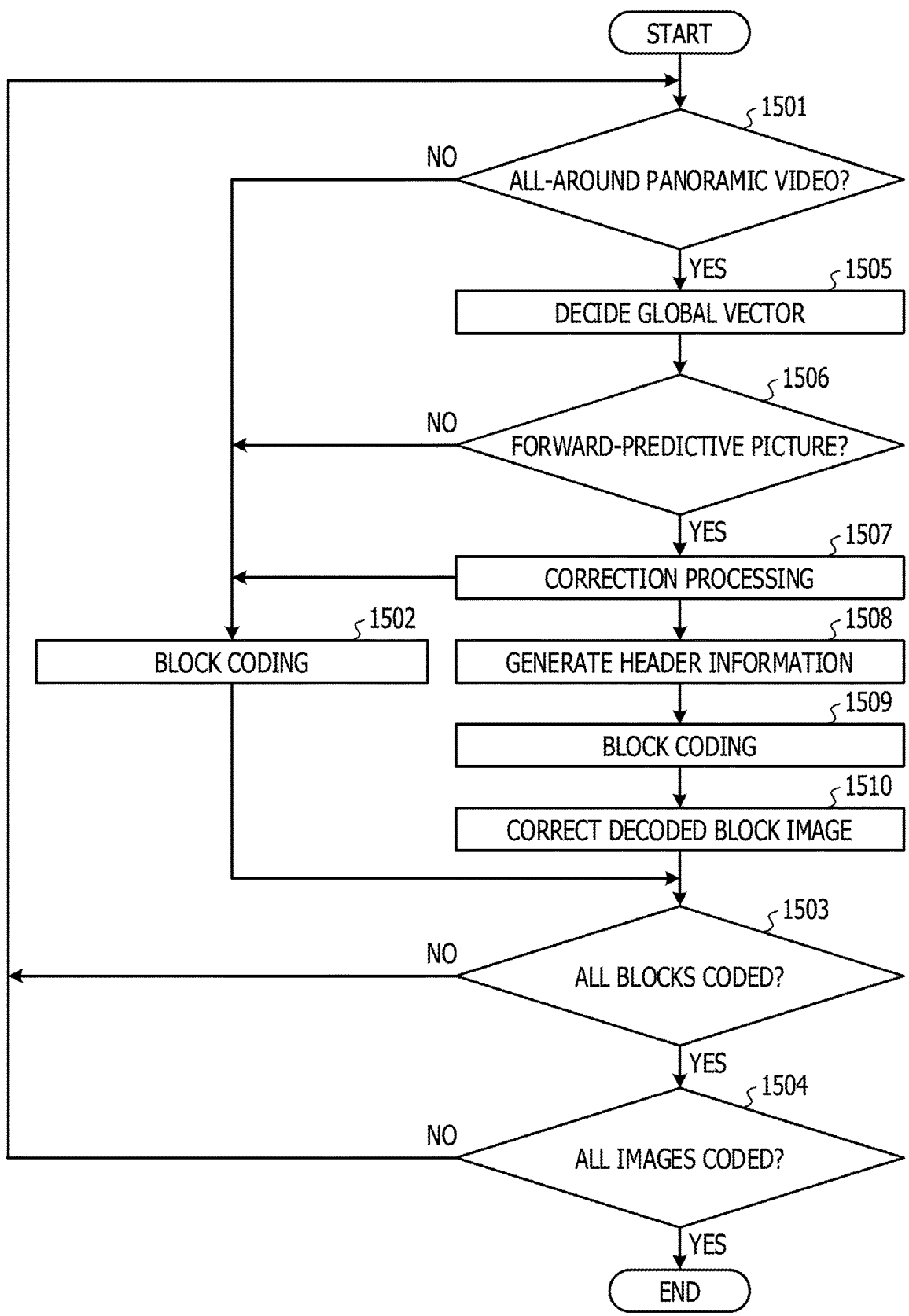
FIG. 15 is a flowchart illustrating a concrete example of first moving image coding processing.

FIG. 15 is a flowchart illustrating a concrete example of moving image coding processing executed by the moving image coding apparatus 1014 of FIG. 11. The moving image coding apparatus 1014 treats an image of each clock time included in coding-target video as the coding-target image and codes the coding-target image on each block basis.

First, the change unit 1101 checks whether or not the coding-target video is all-around panoramic video (step 1501).

If the coding-target video is not all-around panoramic video (step 1501, No), the change unit 1101 outputs the coding-target block to the subtracting unit 1105 and the motion compensation unit 1110 as it is without changing the position of the coding-target block. Then, the moving image coding apparatus 1014 codes the coding-target block (step 1502).

On the other hand, if the coding-target video is all-around panoramic video (step 1501, Yes), the deciding unit 1103 decides the global vector of the coding-target panoramic image (step 1505).

For example, the deciding unit 1103 may decide the motion vector generated more abundantly than the other motion vectors among the motion vectors generated in the coding-target panoramic image as the global vector. The motion vector generated more abundantly than the other motion vectors may be the motion vector generated most abundantly in the coding-target panoramic image. In this case, the motion compensation unit 1110 carries out motion estimation regarding all blocks in the coding-target panoramic image in advance to obtain the motion vector of each block and output the motion vectors to the deciding unit 1103. Then, the deciding unit 1103 selects the motion vector having the largest number of generated vectors and decides the motion vector as the global vector.

By selecting the motion vector having the largest number of generated vectors, the vector that represents the motion of the whole of the coding-target panoramic image may be decided as the global vector. For example, if the area of the background is larger than the area of the foreground and certain motion is observed in the background, the vector that represents the motion of the background is employed as the global vector. Furthermore, if the foreground is in close-up and the area of the foreground is larger than the area of the background, the vector that represents the motion of the foreground is employed as the global vector.

Next, the change unit 1101 checks whether or not the coding-target block is a block of a forward-predictive picture (step 1506). If the coding-target block is not a block of a forward-predictive picture (step 1506, No), the moving image coding apparatus 1014 executes processing of the step 1502 and the subsequent steps.

On the other hand, if the coding-target block is a block of a forward-predictive picture (step 1506, Yes), the change unit 1101 and the determining unit 1102 execute correction processing based on the global vector (step 1507).

If the determining unit 1102 determines not to correct the coding-target block in this correction processing, the moving image coding apparatus 1014 executes the processing of the step 1502 and the subsequent steps. On the other hand, if the determining unit 1102 determines to correct the coding-target block, the change unit 1101 generates the corrected coding-target block by shifting the position of the coding-target block in the direction of the global vector by the magnitude of the global vector.

Next, the ENT 1107 generates header information including information on the global vector (step 1508) and the moving image coding apparatus 1014 codes the corrected coding-target block (step 1509). Then, the change unit 1104 returns the position of the decoded block image to the original position based on the global vector (step 1510). At this time, the change unit 1104 generates the corrected decoded block image by shifting the position of the decoded block image in the opposite direction to the global vector by the magnitude of the global vector, and writes the corrected decoded block image to the frame memory 1112.

Next, the change unit 1101 checks whether or not all blocks in the coding-target image have been coded (step 1503). If a block that has not been coded is left (step 1503, No), the moving image coding apparatus 1014 employs this block as the coding-target block and repeats the processing of the step 1501 and the subsequent steps.

If all blocks have been coded (step 1503, Yes), the change unit 1101 checks whether or not all images included in the coding-target video have been coded (step 1504). If an image that has not been coded is left (step 1504, No), the moving image coding apparatus 1014 employs this image as the coding-target image and repeats the processing of the step 1501 and the subsequent steps. Then, if all images have been coded (step 1504, Yes), the moving image coding apparatus 1014 ends the processing.

For example, if the moving image coding system is HEVC, in the step 1508, the ENT 1107 may transmit the information on the global vector by using user data included in the header information.

For example, user_data_unregistered(payloadSize) of payloadType=5 of supplemental enhancement information (SEI) may be used. In this case, it suffices to ensure the numbers of bits represented by log2_max_mv_length_horizontal and log2_max_mv_length_vertical as the numbers of bits of the X-component and the Y-component, respectively, of the global vector. Alternatively, 16 bits as the maximum value of syntax element thereof may be ensured.

In view of use of the user data for other purposes, it is also preferable to use SEI (user data) in which given identification information that represents the global vector is inserted before the global vector. As the given identification information, an American Standard Code for Information Interchange (ASCII) code corresponding to a given character string that expresses the global vector may be used, for example.

According to the moving image coding processing of FIG. 15, in coding of forward-predictive pictures included in all-around panoramic video, the point of origin of the coding-target panoramic image may be changed according to the motion of the whole of the coding-target panoramic image. This makes it possible to suppress the motion vector information generated regarding the coding-target block and makes it possible to carry out proper motion estimation for all blocks in the coding-target panoramic image. Therefore, the ME efficiency and the coding efficiency are improved.

Figure 16:
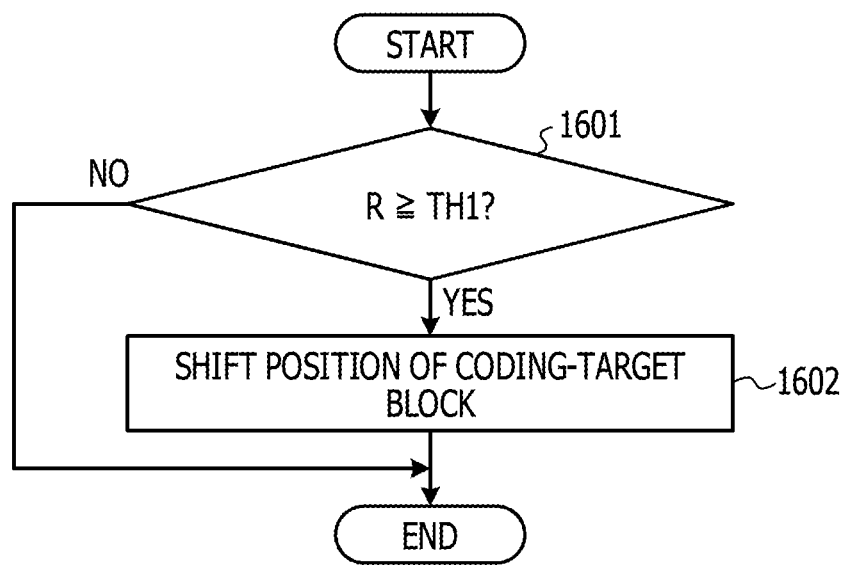
FIG. 16 is a flowchart of correction processing based on the number of generated motion vectors.

FIG. 16 is a flowchart illustrating an example of correction processing in which whether or not to correct the coding-target block is determined by using the number of generated motion vectors in the step 1507 in FIG. 15. First, the determining unit 1102 compares a ratio R of the number Num_GMV of generated vectors of the global vector to the total number Num_AllMV of motion vectors in the coding-target panoramic image with a threshold TH1 (step 1601).

If R is equal to or higher than TH1 (step 1601, Yes), the determining unit 1102 determines to correct the coding-target block. Then, the change unit 1101 shifts the position of the coding-target block by using the global vector to thereby generate the corrected coding-target block (step 1602) and the moving image coding apparatus 1014 executes the processing of the step 1508 and the subsequent steps.

On the other hand, if R is lower than TH1 (step 1601, No), the determining unit 1102 determines not to correct the coding-target block and the moving image coding apparatus 1014 executes the processing of the step 1502 and the subsequent steps.

According to the correction processing of FIG. 16, the position of the coding-target block is changed if the global vector decided by the deciding unit 1103 is generated at a ratio equal to or higher than the given value in the coding-target panoramic image. Due to this, the position of the coding-target block may be shifted according to certain motion generated in the whole of the coding-target panoramic image.

Figure 17:
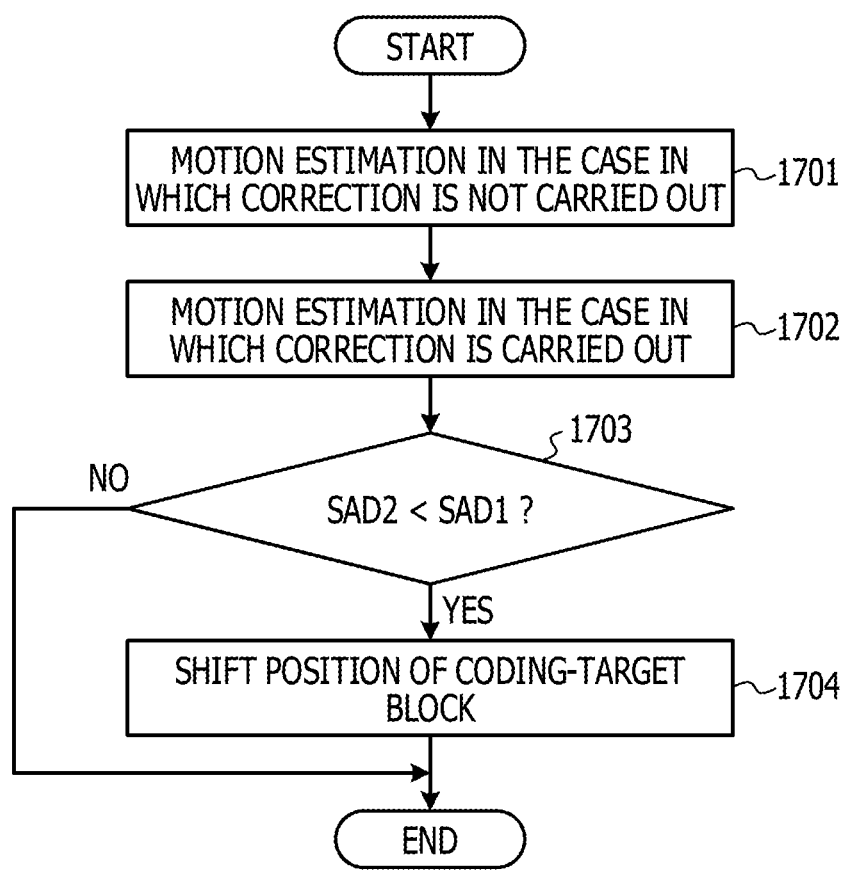
FIG. 17 is a flowchart of correction processing based on motion estimation (ME) efficiency.

FIG. 17 is a flowchart illustrating an example of correction processing in which whether or not to correct the coding-target block is determined by using the ME efficiency in the step 1507 in FIG. 15.

First, the determining unit 1102 requests the motion compensation unit 1110 to carry out motion estimation in the case in which the coding-target panoramic image is not corrected (step 1701). The motion compensation unit 1110 carries out motion estimation for all blocks in the coding-target panoramic image and obtains the motion vector of each block. Then, the motion compensation unit 1110 calculates the sum of absolute differences (SAD) between the reference panoramic image and the coding-target panoramic image and outputs the calculated SAD to the determining unit 1102 as SAD1.

Next, the determining unit 1102 requests the motion compensation unit 1110 to carry out motion estimation in the case in which the coding-target panoramic image is corrected (step 1702). The motion compensation unit 1110 shifts the position of the coding-target block by using the global vector to thereby generate the corrected coding-target block. Next, the motion compensation unit 1110 carries out motion estimation for all blocks in the corrected coding-target panoramic image and obtains the motion vector of each block. Then, the motion compensation unit 1110 calculates the SAD between the reference panoramic image and the corrected coding-target panoramic image and outputs the calculated SAD to the determining unit 1102 as SAD2.

Next, the determining unit 1102 compares SAD1 and SAD2 (step 1703). If SAD2 is smaller than SAD1 (step 1703, Yes), the determining unit 1102 determines to correct the coding-target block. Then, the change unit 1101 shifts the position of the coding-target block by using the global vector to thereby generate the corrected coding-target block (step 1704) and the moving image coding apparatus 1014 executes the processing of the step 1508 and the subsequent steps.

On the other hand, if SAD2 is equal to or larger than SAD1 (step 1703, No), the determining unit 1102 determines not to correct the coding-target block and the moving image coding apparatus 1014 executes the processing of the step 1502 and the subsequent steps.

According to the correction processing of FIG. 17, the position of the coding-target block is changed if the ME efficiency is improved by shifting the position of the coding-target block based on the global vector decided by the deciding unit 1103. This may improve the ME efficiency of the coding-target panoramic image.

Figure 18:
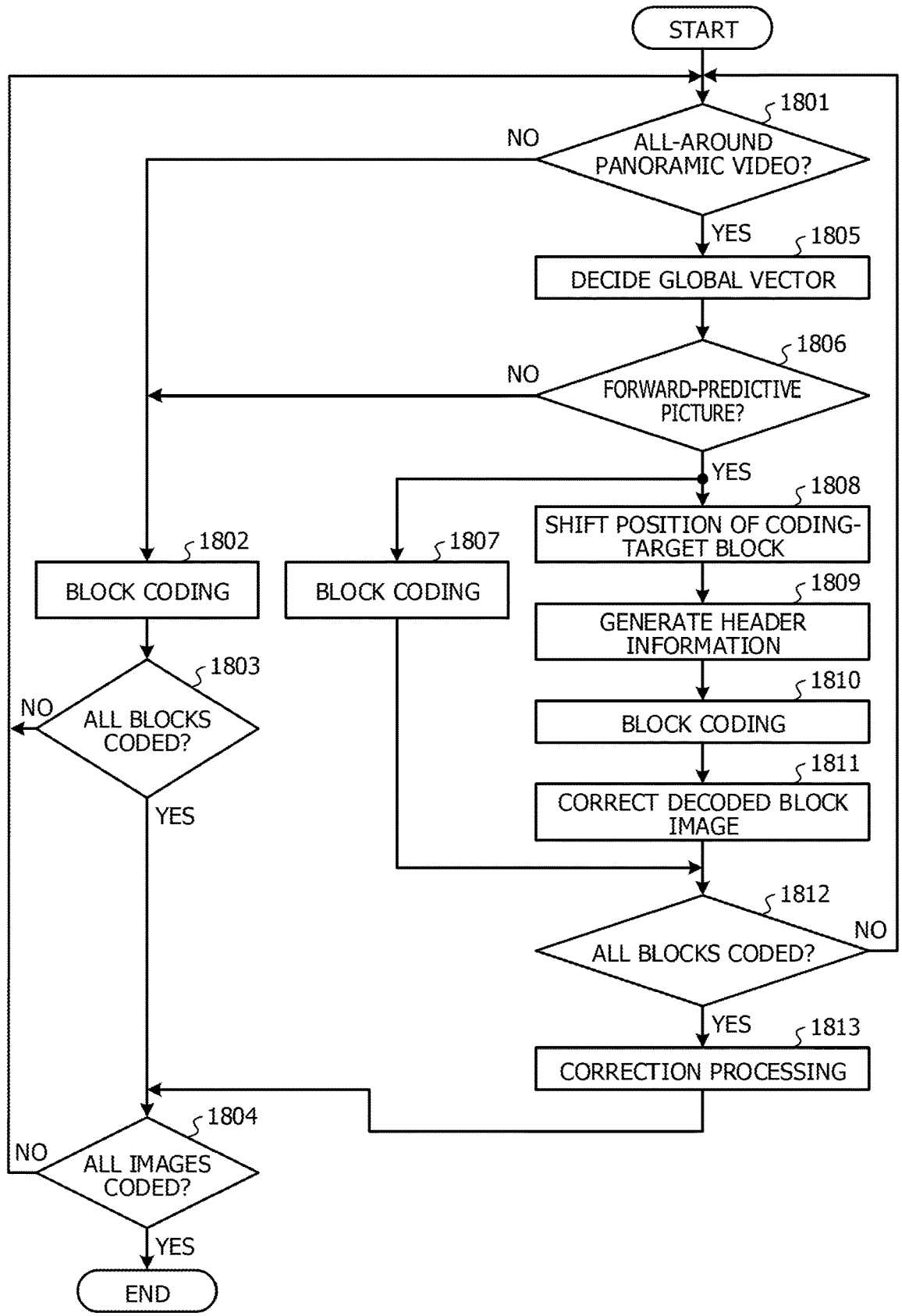
FIG. 18 is a flowchart of moving image coding processing based on coding efficiency.

FIG. 18 is a flowchart illustrating an example of moving image coding processing in which whether or not to correct the coding-target panoramic image is determined by using the coding efficiency. Processing of a step 1801 to a step 1806 is the same as the processing of the step 1501 to the step 1506 in FIG. 15.

If the coding-target block is a block of a forward-predictive picture (step 1806, Yes), the moving image coding apparatus 1014 executes processing of a step 1807 and processing of a step 1808 to a step 1811. The processing of the step 1807 is the same as the processing of the step 1802 in the case in which the coding-target block is not corrected.

In the step 1808, the change unit 1101 shifts the position of the coding-target block by using the global vector to thereby generate the corrected coding-target block. The processing of the step 1809 to the step 1811 is the same as the processing of the step 1508 to the step 1510 in the case in which the coding-target block is corrected in FIG. 15.

Next, the change unit 1101 checks whether or not all blocks in the coding-target image have been coded (step 1812). If a block that has not been coded is left (step 1812, No), the moving image coding apparatus 1014 employs this block as the coding-target block and repeats the processing of the step 1801 and the subsequent steps.

If all blocks have been coded (step 1812, Yes), the change unit 1101 and the determining unit 1102 execute correction processing based on the coding efficiency (step 1813). Then, the moving image coding apparatus 1014 executes the processing of the step 1804 and the subsequent steps.

Figure 19:
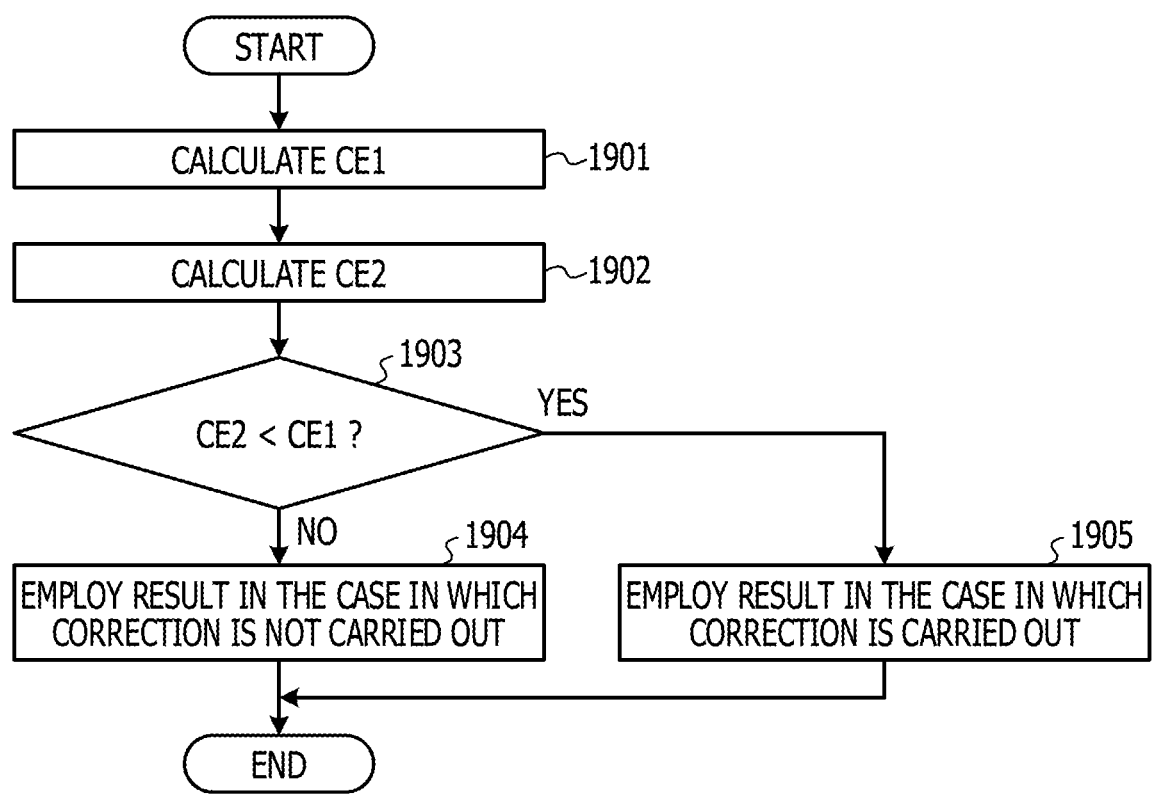
FIG. 19 is a flowchart of correction processing based on coding efficiency.

FIG. 19 is a flowchart illustrating an example of the correction processing in the step 1813 in FIG. 18. The determining unit 1102 calculates the coding efficiency by using the quantization scale used when the T/Q 1106 quantizes a frequency signal and the information amount of the bit stream generated by the ENT 1107. For example, the product of the average of the quantization scales regarding all blocks in the coding-target panoramic image and the total number of bits of the codes generated from the coding-target panoramic image may be used as the coding efficiency of the coding-target panoramic image.

First, the determining unit 1102 calculates coding efficiency CE1 in the case in which the coding-target panoramic image is not corrected from the result of the processing of the step 1807 regarding all blocks in the coding-target panoramic image (step 1901). The coding efficiency CE1 is obtained as the product of an average QP1 of the quantization scales and the total number I1 of bits of the codes in the case in which the coding-target panoramic image is not corrected.

Next, the determining unit 1102 calculates coding efficiency CE2 in the case in which the coding-target panoramic image is corrected from the result of the processing of the step 1808 to the step 1811 regarding all blocks in the coding-target panoramic image (step 1902). The coding efficiency CE2 is obtained as the product of an average QP2 of the quantization scales and the total number I2 of bits of the codes in the case in which the coding-target panoramic image is corrected.

Next, the determining unit 1102 compares CE1 and CE2 (step 1903). If CE2 is lower than CE1 (step 1903, Yes), the determining unit 1102 determines to correct the coding-target panoramic image. Then, the moving image coding apparatus 1014 employs the result of the processing of the step 1808 to the step 1811 (step 1905).

On the other hand, if CE2 is equal to or higher than CE1 (step 1903, No), the determining unit 1102 determines not to correct the coding-target panoramic image and the moving image coding apparatus 1014 employs the result of the processing of the step 1807 (step 1904).

According to the correction processing of FIG. 19, the position of the coding-target block is changed if the coding efficiency is improved by shifting the position of the coding-target block based on the global vector decided by the deciding unit 1103. This may improve the coding efficiency of the coding-target panoramic image.

Figure 20:
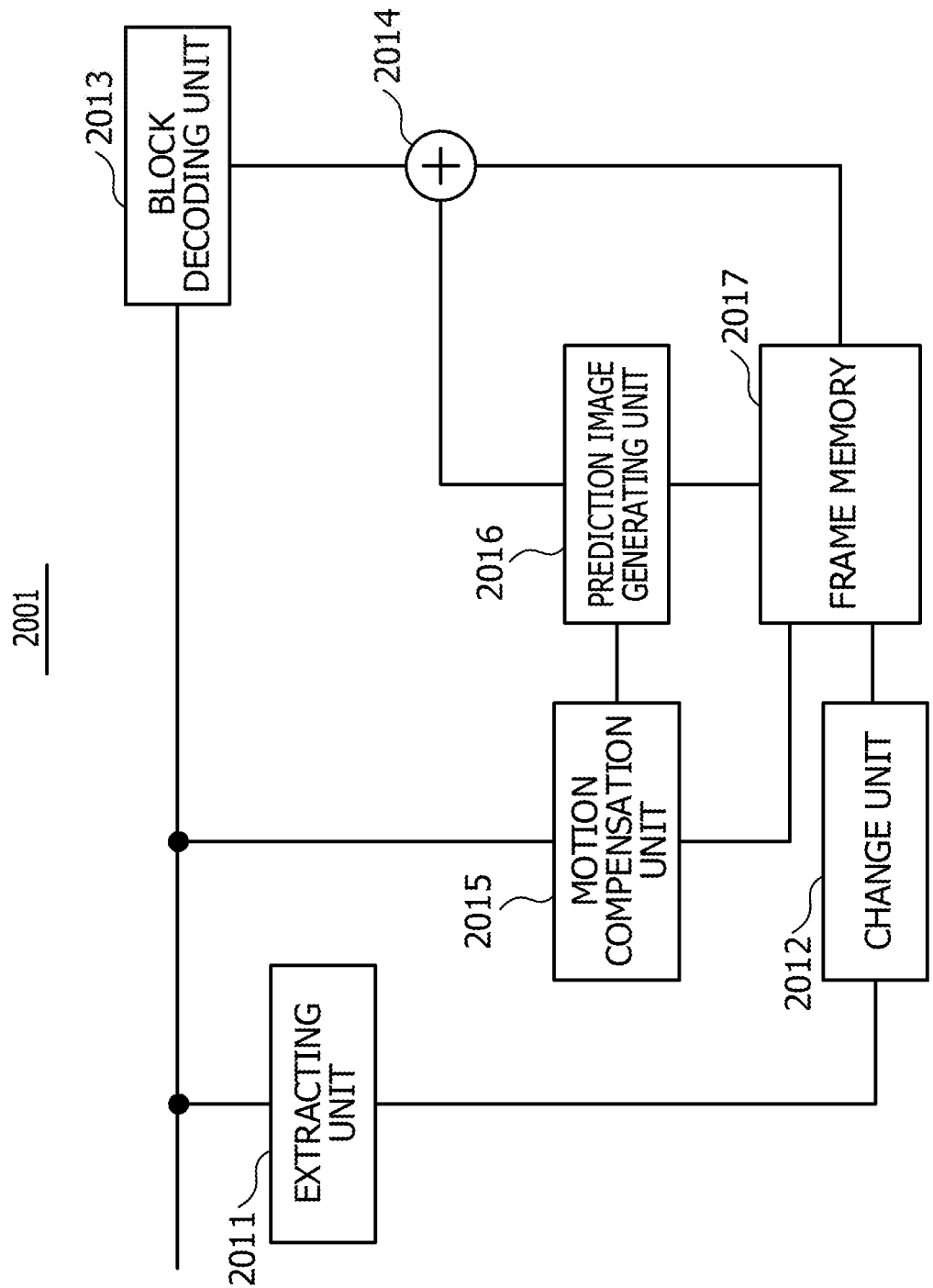
FIG. 20 is a functional configuration diagram illustrating a concrete example of a moving image decoding apparatus.

FIG. 20 illustrates a concrete example of the moving image decoding apparatus 801 of FIG. 8. a moving image decoding apparatus 2001 of FIG. 20 includes an extracting unit 2011, a change unit 2012, a block decoding unit 2013, an adding unit 2014, a motion compensation unit 2015, a prediction image generating unit 2016, and a frame memory 2017.

The extracting unit 2011 corresponds to the extracting unit 812 in FIG. 8. The change unit 2012 corresponds to the correcting unit 814. The block decoding unit 2013, the adding unit 2014, the motion compensation unit 2015, and the prediction image generating unit 2016 correspond to the decoding unit 813. The frame memory 2017 corresponds to the storing unit 811.

A bit stream output by the moving image coding apparatus 1014 of FIG. 11 is input to the moving image decoding apparatus 2001 as coded panoramic video. The moving image decoding apparatus 2001 decodes a coded panoramic image of each clock time included in the coded panoramic video to restore coding-target panoramic video.

The extracting unit 2011 extracts information on a global vector from header information included in the coded panoramic video and outputs the information to the change unit 2012.

The block decoding unit 2013 inversely quantizes coefficient information of each decoding-target block in the coded panoramic image to generate a frequency signal, and transforms the frequency signal to a reconstructed prediction error signal by an inverse orthogonal transform. Then, the block decoding unit 2013 outputs the reconstructed prediction error signal to the adding unit 2014.

The adding unit 2014 generates a decoded block image by adding a prediction block image output from the prediction image generating unit 2016 and the reconstructed prediction error signal, and outputs the generated decoded block image to the frame memory 2017. If a global vector regarding the coded panoramic image is output from the extracting unit 2011, the change unit 2012 returns the position of the decoded block image to the position of the coding-target block before the change based on the global vector.

The frame memory 2017 accumulates the decoded block image and outputs the accumulated decoded block image to the motion compensation unit 2015 and the prediction image generating unit 2016 as a reference image. Plural decoded block images generated from a respective one of plural decoding-target blocks in the coded panoramic image correspond to a decoded panoramic image. Furthermore, plural decoded block images after the change in the position by the change unit 2012 represent the decoded coding-target panoramic image and correspond to a reference panoramic image.

The motion compensation unit 2015 acquires the reference image indicated by a motion vector from the reference panoramic image and outputs the reference image to the prediction image generating unit 2016.

The prediction image generating unit 2016 generates an intra-prediction block image of the decoding-target block from the pixel value of peripheral pixels that have been already decoded in the coded panoramic image by using the reference image. Furthermore, the prediction image generating unit 2016 uses the reference image output from the motion compensation unit 2015 as an inter-prediction block image. Then, the prediction image generating unit 2016 selects either the intra-prediction block image or the inter-prediction block image and outputs the selected prediction block image to the adding unit 2014.

Figure 21:
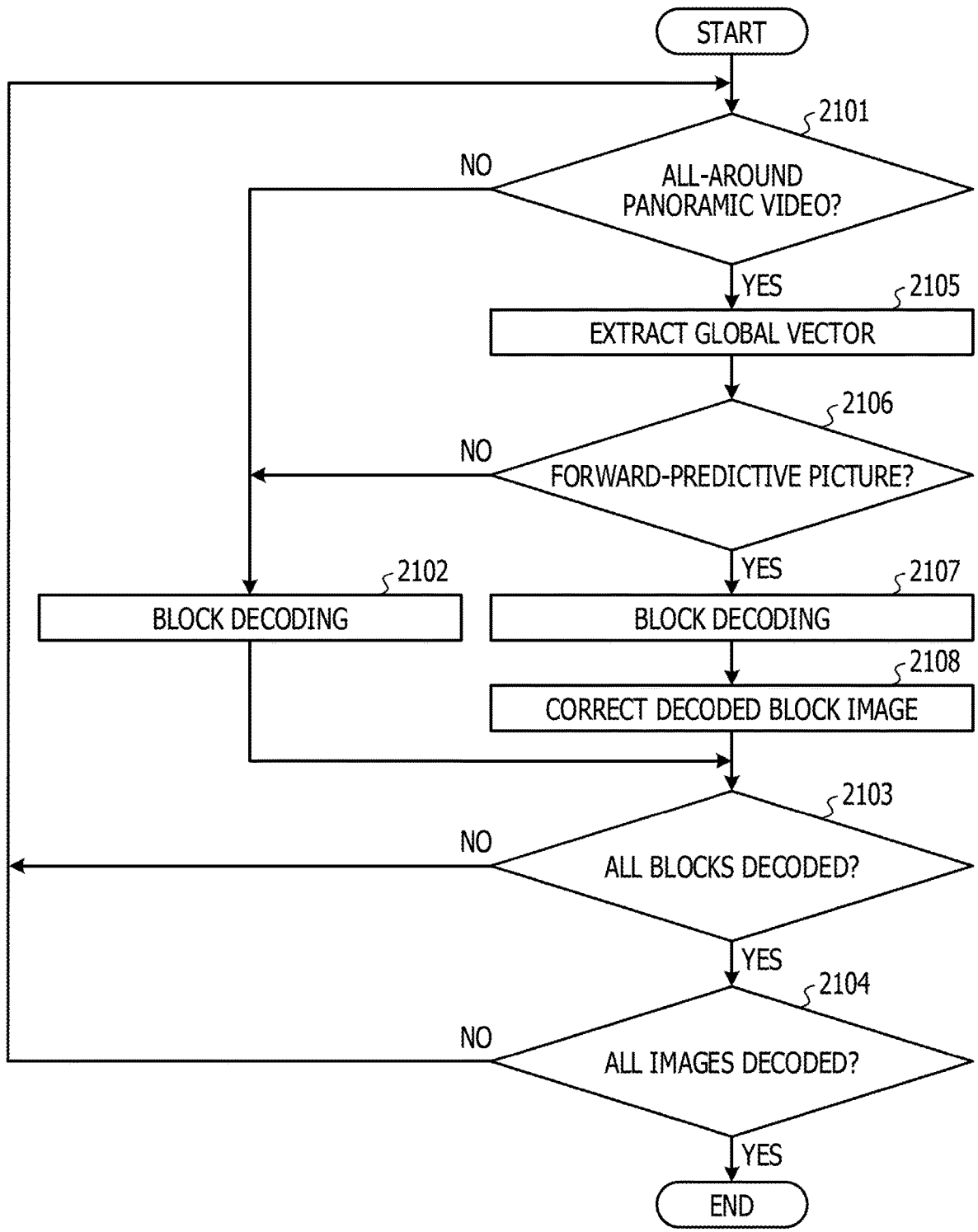
FIG. 21 is a flowchart illustrating a concrete example of moving image decoding processing.

FIG. 21 is a flowchart illustrating a concrete example of moving image decoding processing executed by the moving image decoding apparatus 2001 of FIG. 20. The moving image decoding apparatus 2001 treats an image of each clock time included in coded video as the decoding-target image and decodes the decoding-target image on each block basis.

First, the moving image decoding apparatus 2001 checks whether or not the decoding-target video is all-around panoramic video (step 2101). If the decoding-target video is not all-around panoramic video (step 2101, No), the moving image decoding apparatus 2001 decodes the decoding-target block as it is (step 2102).

On the other hand, if the decoding-target video is all-around panoramic video (step 2101, Yes), the extracting unit 2011 extracts information on a global vector from header information (step 2105).

Next, the moving image decoding apparatus 2001 checks whether or not the decoding-target block is a block of a forward-predictive picture (step 2106). If the decoding-target block is not a block of a forward-predictive picture (step 2106, No), the moving image decoding apparatus 2001 executes the processing of the step 2102 and the subsequent steps.

On the other hand, if the decoding-target block is a block of a forward-predictive picture (step 2106, Yes), the moving image decoding apparatus 2001 decodes the decoding-target block (step 2107). Then, the change unit 2012 returns the position of the decoded block image to the position of the coding-target block before the change based on the global vector (step 2108). At this time, the change unit 2012 generates the corrected decoded block image by shifting the position of the decoded block image in the opposite direction to the global vector by the magnitude of the global vector, and writes the corrected decoded block image to the frame memory 2017.

Next, the moving image decoding apparatus 2001 checks whether or not all blocks in the decoding-target image have been decoded (step 2103). If a block that has not been decoded is left (step 2103, No), the moving image decoding apparatus 2001 employs this block as the decoding-target block and repeats the processing of the step 2101 and the subsequent steps.

If all blocks have been decoded (step 2103, Yes), the moving image decoding apparatus 2001 checks whether or not all images included in the decoding-target video have been decoded (step 2104). If an image that has not been decoded is left (step 2104, No), the moving image decoding apparatus 2001 employs this image as the decoding-target image and repeats the processing of the step 2101 and the subsequent steps. Then, if all images have been decoded (step 2104, Yes), the moving image decoding apparatus 2001 ends the processing.

Next, description will be made about operation in the case in which the moving image coding apparatus 1014 of FIG. 11 corresponds to the moving image coding apparatus 601 of FIG. 6. In this case, the change unit 1101 and the determining unit 1102 correspond to the correcting unit 613 and the deciding unit 1103 corresponds to the deciding unit 612. The subtracting unit 1105, the T/Q 1106, the ENT 1107, the IQ/IT 1108, the adding unit 1109, the motion compensation unit 1110, and the prediction image generating unit 1111 correspond to the coding unit 614 and the frame memory 1112 corresponds to the storing unit 611.

When the photographing unit 1011 in FIG. 10 is moving, it is envisaged that the photographic range of all-around panoramic video changes over time and the subject that appears in the video also changes. In this case, even when the whole of each panoramic image included in the all-around panoramic video is converted to an extended panoramic image, it is difficult to interpret the panoramic images as one moving image. Therefore, it is effective to extract a partial region from each panoramic image and convert the partial region to a rectangular shape as illustrated in FIG. 3 to thereby generate a moving image of the extracted partial region.

In this case, the combining unit 1012 may generate coding-target panoramic video by combining plural pieces of video photographed by plural imaging devices included in the photographing unit 1011. An extended panoramic image generated by the extending unit 1013 is input to the moving image coding apparatus 1014 as the coding-target panoramic image.

The deciding unit 1103 decides a global vector that represents the amount of shift of the coding-target block relative to a reference image stored by the frame memory 1112 by using a motion vector output from the motion compensation unit 1110. Then, the deciding unit 1103 outputs the decided global vector to the change unit 1101.

For example, the deciding unit 1103 may decide the motion vector of a specific block in the coding-target panoramic image as the global vector. In this case, the motion compensation unit 1110 carries out motion estimation regarding all blocks in the coding-target panoramic image in advance to obtain the motion vector of each block and output the motion vectors to the deciding unit 1103. Then, the deciding unit 1103 selects the motion vector of the specific block and decides the motion vector as the global vector.

By using the motion vector of the specific block as the global vector, the position of the partial region extracted from the coding-target panoramic image may be shifted in matching with the motion of the block. Due to this, the image of the partial region displayed on a screen is corrected in such a manner that the subject that appears in the specific block typically appears at the same position in the screen. This makes it possible to generate video that follows the specific subject.

For example, if the moving image coding apparatus 1014 includes a display device equipped with a touch panel, the deciding unit 1103 obtains the address of a block to which a position touched by a user in the screen belongs, and may decide the specific block by using the address. If the moving image coding apparatus 1014 does not include a touch panel, the address of a block is calculated from coordinates that represent a position in the screen and the specific block may be specified by using the calculated address.

For example, if the block size is 16×16 and the coordinates of a pixel specified in the screen are (x, y), the address of the block is [x/16, y/16]. Furthermore, if the block size is 64×64 and the coordinates of a pixel specified in the screen are (x, y), the address of the block is [x/64, y/64].

Figure 22:
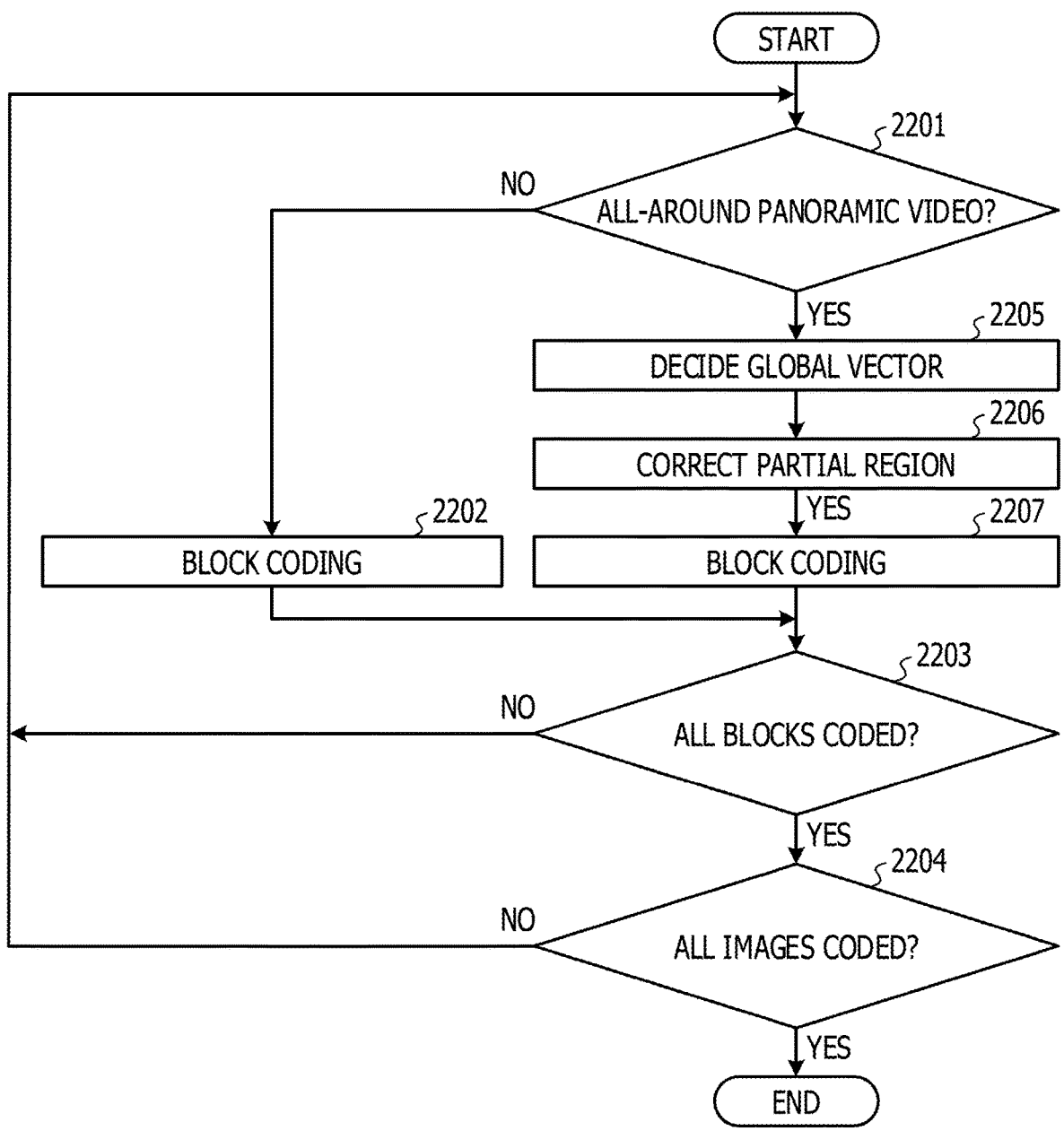
FIG. 22 is a flowchart illustrating a concrete example of second moving image coding processing.

FIG. 22 is a flowchart illustrating a concrete example of moving image coding processing in the case in which the moving image coding apparatus 1014 corresponds to the moving image coding apparatus 601. The moving image coding apparatus 1014 treats an image of each clock time included in coding-target video as the coding-target image and codes the coding-target image on each block basis.

If coding-target video is all-around panoramic video, the moving image coding apparatus 1014 employs one or plural partial regions extracted from the coding-target panoramic image as the target and codes the image of the partial region on each block basis.

First, the change unit 1101 checks whether or not coding-target video is all-around panoramic video (step 2201).

If the coding-target video is not all-around panoramic video (step 2201, No), the change unit 1101 outputs the coding-target block to the subtracting unit 1105 and the motion compensation unit 1110 as it is. Then, the moving image coding apparatus 1014 codes the coding-target block (step 2202).

On the other hand, if the coding-target video is all-around panoramic video (step 2201, Yes), the deciding unit 1103 decides the global vector of the coding-target panoramic image (step 2205).

Next, the change unit 1101 shifts the position of the coding-target block in the opposite direction to the global vector by the magnitude of the global vector in the coding-target panoramic image to thereby set a new coding-target block (step 2206). Then, the moving image coding apparatus 1014 codes the set new coding-target block (step 2207). By shifting the position of each block in the partial region in the direction opposite to the global vector, the corrected partial region may be generated through change in the point of origin of the partial region.

Next, the change unit 1101 checks whether or not all blocks in the coding-target image or the partial region have been coded (step 2203). If a block that has not been coded is left (step 2203, No), the moving image coding apparatus 1014 employs this block as the coding-target block and repeats the processing of the step 2201 and the subsequent steps.

If all blocks have been coded (step 2203, Yes), the change unit 1101 checks whether or not all images included in the coding-target video have been coded (step 2204). If an image that has not been coded is left (step 2204, No), the moving image coding apparatus 1014 employs this image as the coding-target image and repeats the processing of the step 2201 and the subsequent steps. Then, if all images have been coded (step 2204, Yes), the moving image coding apparatus 1014 ends the processing.

In the moving image coding processing of FIG. 22, processing of returning the position of the decoded block image to the original position based on the global vector is not executed differently from the moving image coding processing of FIG. 15. Furthermore, also in a moving image decoding apparatus, processing of returning the position of the decoded block image to the original position is not executed. Therefore, the moving image coding apparatus 1014 does not need to transmit information on a global vector to the moving image decoding apparatus.

According to the moving image coding processing of FIG. 22, even if the photographic range of video of each of plural imaging devices changes due to the movement of the photographing unit 1011, the point of origin of the partial region extracted from the coding-target panoramic image may be changed according to the motion of a specific block. This makes it possible to suppress the motion vector information generated regarding each block in the partial region and makes it possible to carry out proper motion estimation for each block. Therefore, the ME efficiency and the coding efficiency are improved.

The configurations of the moving image coding apparatuses 401, 601, and 1014 of FIG. 4, FIG. 6, and FIG. 11 are merely one example and a partial constituent element may be omitted or changed according to the use purpose or the condition of the moving image coding apparatuses. For example, in the moving image coding apparatus 1014 of FIG. 11, the ENT 1107 may be omitted if entropy coding is not carried out.

The configurations of the moving image decoding apparatuses 801 and 2001 of FIG. 8 and FIG. 20 are merely one example and a partial constituent element may be omitted or changed according to the use purpose or the condition of the moving image decoding apparatuses. The configuration of the panoramic video coding system 1001 of FIG. 10 is merely one example and a partial constituent element may be omitted or changed according to the use purpose or the condition of the panoramic video coding system. For example, the combining unit 1012 may be omitted if the photographing unit 1011 includes only one imaging device.

The flowcharts illustrated in FIG. 5, FIG. 7, FIG. 9, FIG. 15 to FIG. 19, FIG. 21, and FIG. 22 are merely one example and partial processing may be omitted or changed according to the configuration or the condition of the moving image coding apparatus or the moving image decoding apparatus. For example, in the moving image coding processing of FIG. 15, the processing of the step 1501 and the step 1502 may be omitted if input coding-target video is limited to all-around panoramic video. The deciding unit 1103 does not need to execute the processing of the step 1505 every time regarding each block and may execute the processing of the step 1505 only one time regarding one coding-target panoramic image.

In the correction processing of FIG. 17, the motion compensation unit 1110 may calculate, instead of the SAD, another index that represents the difference between the reference panoramic image and the coding-target panoramic image, and the determining unit 1102 may determine whether or not to correct the coding-target block by using the index.

In the moving image coding processing of FIG. 18, the processing of the step 1801 and the step 1802 may be omitted if input coding-target video is limited to all-around panoramic video. The deciding unit 1103 does not need to execute the processing of the step 1805 every time regarding each block and may execute the processing of the step 1805 only one time regarding one coding-target panoramic image.

In the correction processing of FIG. 19, the determining unit 1102 may calculate the coding efficiency by using, instead of the average of the quantization scales, another statistic such as the median or the maximum.

In the moving image decoding processing of FIG. 21, the processing of the step 2101 and the step 2102 may be omitted if input decoding-target video is limited to all-around panoramic video. The extracting unit 2011 does not need to execute the processing of the step 2105 every time regarding each block and may execute the processing of the step 2105 only one time regarding one decoding-target image.

In the moving image coding processing of FIG. 22, the processing of the step 2201 and the step 2202 may be omitted if input coding-target video is limited to all-around panoramic video. The deciding unit 1103 does not need to execute the processing of the step 2205 every time regarding each block and may execute the processing of the step 2205 only one time regarding one coding-target panoramic image.

The extended panoramic images in FIG. 1 to FIG. 3 are merely one example and another extended panoramic image may be used according to the configuration of condition of the panoramic video coding system.

The all-around panoramic images in FIG. 12 to FIG. 14 are merely one example and the all-around panoramic image changes according to the subject that exists in the photographic range. The movement direction of the subject that appears in the coding-target panoramic image is not limited to the horizontal direction and is the vertical direction or an oblique direction in some cases. Even when the motion of the whole of the coding-target panoramic image is the vertical direction or an oblique direction, the moving image coding processing of FIG. 5, FIG. 7, FIG. 15, FIG. 18, and FIG. 22 and the moving image decoding processing of FIG. 9 and FIG. 21 may be applied. Instead of a panoramic image that has been coded at the clock time immediately before the coding-target panoramic image, a panoramic image that has been coded at another clock time may be used as the reference panoramic image.

Figure 23:
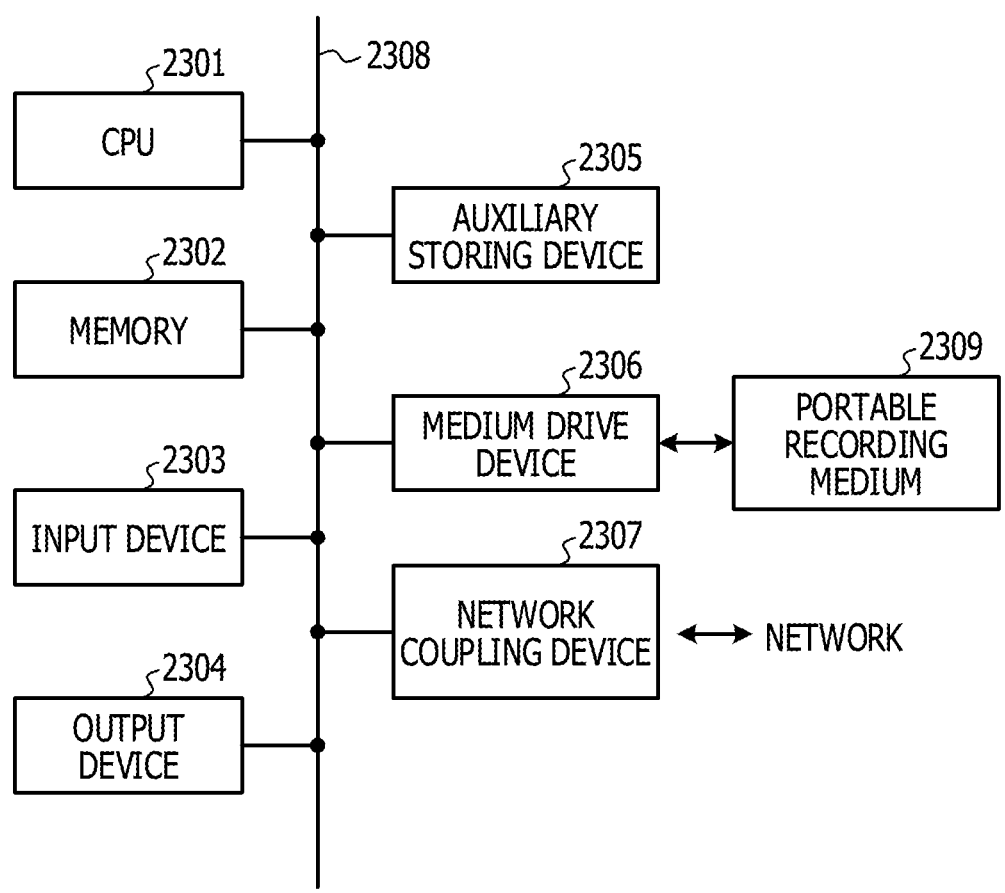
FIG. 23 is a configuration diagram of an information processing apparatus.

FIG. 23 illustrates a configuration example of an information processing apparatus (computer) used as the moving image coding apparatus of FIG. 4, FIG. 6, or FIG. 11 or the moving image decoding apparatus of FIG. 8 or FIG. 20. The information processing apparatus of FIG. 23 includes a central processing unit (CPU) 2301, a memory 2302, an input device 2303, an output device 2304, an auxiliary storing device 2305, a medium drive device 2306, and a network coupling device 2307. These configuration elements are coupled to each other by a bus 2308.

The memory 2302 is a read only memory (ROM), a random access memory (RAM), and a semiconductor memory such as a flash memory, and stores programs and data used for moving image coding processing or moving image decoding processing. The memory 2302 may be used as the storing unit 411 in FIG. 4, the storing unit 611 in FIG. 6, the storing unit 811 in FIG. 8, the frame memory 1112 in FIG. 11, and the frame memory 2017 in FIG. 20.

The CPU 2301 (processor) operates as the deciding unit 412, the correcting unit 413, and the coding unit 414 in FIG. 4 by using the memory 2302 to execute a program, for example. The CPU 2301 also operates as the deciding unit 612, the correcting unit 613, and the coding unit 614 in FIG. 6 by using the memory 2302 to execute a program. The CPU 2301 also operates as the extracting unit 812, the decoding unit 813, and the correcting unit 814 in FIG. 8 by using the memory 2302 to execute a program.

The CPU 2301 also operates as the change unit 1101, the determining unit 1102, the deciding unit 1103, the change unit 1104, the subtracting unit 1105, the T/Q 1106, and the ENT 1107 in FIG. 11 by using the memory 2302 to execute a program. The CPU 2301 also operates as the IQ/IT 1108, the adding unit 1109, the motion compensation unit 1110, and the prediction image generating unit 1111.

The CPU 2301 also operates as the extracting unit 2011, the change unit 2012, the block decoding unit 2013, the adding unit 2014, the motion compensation unit 2015, and the prediction image generating unit 2016 in FIG. 20 by using the memory 2302 to execute a program.

The input device 2303 is a keyboard, a pointing device, and so forth and is used for input of instruction and information from a user or an operator. The output device 2304 is a display device, a printer, a speaker, and so forth and is used for an inquiry to a user or an operator and output of a processing result. If the information processing apparatus is a moving image decoding apparatus, the processing result may be restored coding-target panoramic video.

The auxiliary storing device 2305 is a magnetic disk device, an optical disk device, a magneto-optical disk device, a tape device, or the like. The auxiliary storing device 2305 may be a hard disk drive or a flash memory. The information processing apparatus may store programs and data in the auxiliary storing device 2305 and load the programs and the data into the memory 2302 to use the programs and the data.

The medium drive device 2306 drives a portable recording medium 2309 and accesses the contents of recording thereof. The portable recording medium 2309 is a memory device, a flexible disk, an optical disk, a magneto-optical disk, or the like. The portable recording medium 2309 may be a compact disk read only memory (CD-ROM), a digital versatile disk (DVD), or a universal serial bus (USB) memory. A user or an operator may store programs and data in this portable recording medium 2309 and load the programs and the data into the memory 2302 to use the programs and the data.

As above, in computer-readable recording media that store programs and data used for processing, physical (non-transitory) recording media such as the memory 2302, the auxiliary storing device 2305, and the portable recording medium 2309 are included.

The network coupling device 2307 is a communication interface that is coupled to a communication network such as a local area network (LAN) or the Internet and carries out data conversion that accompanies communication. If the information processing apparatus is a moving image coding apparatus, the network coupling device 2307 may transmit a bit stream of coded panoramic video to a moving image decoding apparatus. If the information processing apparatus is a moving image decoding apparatus, the network coupling device 2307 may receive a bit stream of coded panoramic video from a moving image coding apparatus.

It is also possible for the information processing apparatus to receive programs and data from an external apparatus through the network coupling device 2307 and load the programs and the data into the memory 2302 to use the programs and the data.

The information processing apparatus does not need to include all constituent elements in FIG. 23 and it is also possible to omit a partial constituent element according to the use purpose or the condition. For example, the input device 2303 and the output device 2304 may be omitted if the interface with the user or the operator is unnecessary. Furthermore, the medium drive device 2306 may be omitted if the information processing apparatus does not access the portable recording medium 2309.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus for moving image coding, the apparatus comprising:
    a memory configured to store a reference panoramic image used for coding a coding-target panoramic image obtained by transforming a panoramic image captured by an imaging device; and
    a processor coupled to the memory, the processor being configured to
    decide a vector that represents an amount of shift of the coding-target panoramic image relative to the reference panoramic image,
    generate a corrected coding-target panoramic image by correcting a position of each of a plurality of coding-target regions in the coding-target panoramic image in accordance with the amount of shift indicated by the vector,
    obtain a first difference based on first motion estimation with use of the reference panoramic image and the coding-target panoramic image before correction,
    obtain a second difference based on second motion estimation with use of the reference panoramic image and the corrected coding-target panoramic image,
    in response to the obtaining of the second difference smaller than the first difference, perform coding processing on an image of each of the plurality of coding-target regions in the corrected coding-target panoramic image by using the reference panoramic image,
    in response to the obtaining of the second difference equal to or greater than the first difference, perform the coding processing on an image of each of the plurality of coding-target regions in the coding-target panoramic image before the correcting by using the reference panoramic image.

2. The apparatus according to claim 1,
    wherein the deciding of the vector is configured to decide, as the vector that represents the amount of shift, a motion vector generated more abundantly than other motion vectors among motion vectors of a respective one of the plurality of coding-target regions before correction.

3. The apparatus according to claim 2,
    wherein the generating of the corrected coding-target panoramic image is configured to correct a position of each of the plurality of coding-target regions before correction based on the vector that represents the amount of shift if a ratio of the number of vectors that represent the amount of shift to the total number of motion vectors in the coding-target panoramic image before the correction is higher than a given value.

4. The apparatus according to claim 2,
    wherein the processor is configured to
    correct a position of each of the plurality of coding-target regions before the correction based on the vector that represents the amount of shift if the second difference is smaller than the first difference.

5. The apparatus according to claim 2,
    wherein the processor is configured to
    obtain a first quantization scale based on first motion estimation with use of the reference panoramic image and the coding-target panoramic image before correction and an information amount of codes based on the first motion estimation, and
    obtain a second quantization scale based on second motion estimation with use of the reference panoramic image and the corrected coding-target panoramic image and an information amount of codes based on the second motion estimation, and
    wherein the generating of the corrected coding-target panoramic image is configured to correct a position of each of the plurality of coding-target regions before the correction based on the vector that represents the amount of shift when a product of the second quantization scale and the information amount of the codes based on the second motion estimation is smaller than a product of the first quantization scale and the information amount of the codes based on the first motion estimation.

6. A non-transitory computer-readable storage medium for storing a program for moving image coding, the program causing a computer to execute a process, the process comprising:
    deciding a vector that represents an amount of shift of a coding-target panoramic image relative to a reference panoramic image, the reference panoramic image being used for coding the coding-target panoramic image obtained by transforming a panoramic image captured by an imaging device;

generating a corrected coding-target panoramic image by correcting a position of each of a plurality of coding-target regions in the coding-target panoramic image in accordance with the amount of shift indicated by the vector, obtaining a first difference based on first motion estimation with use of the reference panoramic image and the coding-target panoramic image before correction, obtaining a second difference based on second motion estimation with use of the reference panoramic image and the corrected coding-target panoramic image, in response to the obtaining of the second difference smaller than the first difference, perform coding processing on an image of each of the plurality of coding-target regions in the corrected coding-target panoramic image by using the reference panoramic image, in response to the obtaining of the second difference equal to or greater than the first difference, perform the coding processing on an image of each of the plurality of coding-target regions in the coding-target panoramic image before the correcting by using the reference panoramic image.

7. The non-transitory computer-readable storage medium according to claim 6, wherein the deciding of the vector is configured to decide, as the vector that represents the amount of shift, a motion vector generated more abundantly than other motion vectors among motion vectors of a respective one of the plurality of coding-target regions before correction.

8. The non-transitory computer-readable storage medium according to claim 7, wherein the generating of the corrected coding-target panoramic image is configured to correct a position of each of the plurality of coding-target regions before correction based on the vector that represents the amount of shift if a ratio of the number of vectors that represent the amount of shift to the total number of motion vectors in the coding-target panoramic image before the correction is higher than a given value.

9. The non-transitory computer-readable storage medium according to claim 7, the process further comprising obtaining a first quantization scale based on first motion estimation with use of the reference panoramic image and the coding-target panoramic image before correction and an information amount of codes based on the first motion estimation, and obtaining a second quantization scale based on second motion estimation with use of the reference panoramic image and the corrected coding-target panoramic image and an information amount of codes based on the second motion estimation, and wherein the generating of the corrected coding-target panoramic image is configured to correct a position of each of the plurality of coding-target regions before the correction based on the vector that represents the amount of shift when a product of the second quantization scale and the information amount of the codes based on the second motion estimation is smaller than a product of the first quantization scale and the information amount of the codes based on the first motion estimation.

* * * * *